(12) United States Patent
Popovich et al.

(10) Patent No.: US 9,262,011 B2
(45) Date of Patent: Feb. 16, 2016

(54) INTERACTIVE INPUT SYSTEM AND METHOD

(75) Inventors: David Gregory Popovich, Nepean (CA); Yunqiu Rachel Wang, Calgary (CA); Vaughn E. Keenan, Calgary (CA); Grant McGibney, Calgary (CA); Robbie Rattray, Calgary (CA); Patrick James Gurtler, Ottawa (CA); Chris Willson, Calgary (CA); Nicholas Svensson, Calgary (CA)

(73) Assignee: SMART Technologies ULC, Calgary (CA)

( * ) Notice: Subject to any disclaimer, the term of this patent is extended or adjusted under 35 U.S.C. 154(b) by 997 days.

(21) Appl. No.: 13/075,508

(22) Filed: Mar. 30, 2011

(65) Prior Publication Data
US 2012/0249477 A1 Oct. 4, 2012

(51) Int. Cl.
*G06F 3/042* (2006.01)

(52) U.S. Cl.
CPC ...... *G06F 3/042* (2013.01); *G06F 2203/04109* (2013.01)

(58) Field of Classification Search
CPC ... G06F 3/0317; G06F 3/0386; G06F 3/0421; G06F 3/0428
USPC ............. 345/173–178, 166; 178/18.01–20.04
See application file for complete search history.

(56) References Cited

U.S. PATENT DOCUMENTS

| | | | |
|---|---|---|---|
| 4,542,375 A * | 9/1985 | Alles et al. ..................... 345/176 |
| 5,165,005 A * | 11/1992 | Klainer et al. ................. 385/129 |
| 5,448,263 A | 9/1995 | Martin |
| 6,141,000 A | 10/2000 | Martin |
| 6,337,681 B1 | 1/2002 | Martin |
| 6,747,636 B2 | 6/2004 | Martin |
| 6,803,906 B1 | 10/2004 | Morrison et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 7,442,914 B2 * | 10/2008 | Eliasson et al. ............... 250/221 |
| 7,465,914 B2 * | 12/2008 | Eliasson et al. ............... 250/221 |
| 7,692,625 B2 | 4/2010 | Morrison et al. |
| 2004/0252091 A1 | 12/2004 | Ma |
| 2006/0114237 A1 * | 6/2006 | Crockett et al. .............. 345/173 |
| 2008/0179507 A2 | 7/2008 | Han |
| 2008/0284925 A1 | 11/2008 | Han |
| 2009/0027357 A1 | 1/2009 | Morrison |
| 2009/0122020 A1 * | 5/2009 | Eliasson et al. ............... 345/173 |
| 2009/0146973 A1 * | 6/2009 | Ung ..................... G06F 3/03545 345/176 |

(Continued)

OTHER PUBLICATIONS

U.S. Appl. No. 61/239,057, filed Sep. 1, 2009, entitled, "Interactive Input System With Improved Signal-To-Noise Ratio (SNR) and Image Capture Method."

*Primary Examiner* — Thuy Pardo
(74) *Attorney, Agent, or Firm* — Katten Muchin Rosenman LLP

(57) ABSTRACT

An interactive input system comprises an optical waveguide, a radiation source directing radiation into the optical waveguide, the radiation undergoing total internal reflection within the optical waveguide in response to at least one touch input on a surface of the optical waveguide. At least one imaging device is positioned adjacent to the waveguide, the at least one imaging device having a field of view looking inside the optical waveguide and capturing image frames thereof. Processing structure processes the image frames captured by the at least one imaging device to determine a location of the at least one touch input based on a frequency of reflections of the radiation appearing in the image frame.

34 Claims, 34 Drawing Sheets

(56) References Cited

U.S. PATENT DOCUMENTS

| | | |
|---|---|---|
| 2009/0277694 A1 | 11/2009 | Hansen |
| 2011/0032215 A1* | 2/2011 | Sirotich ................ G06F 3/0425 345/175 |
| 2011/0050650 A1* | 3/2011 | McGibney ............ G06F 3/0386 345/175 |
| 2013/0120316 A1* | 5/2013 | Ung .................... G06F 3/03545 345/175 |

* cited by examiner

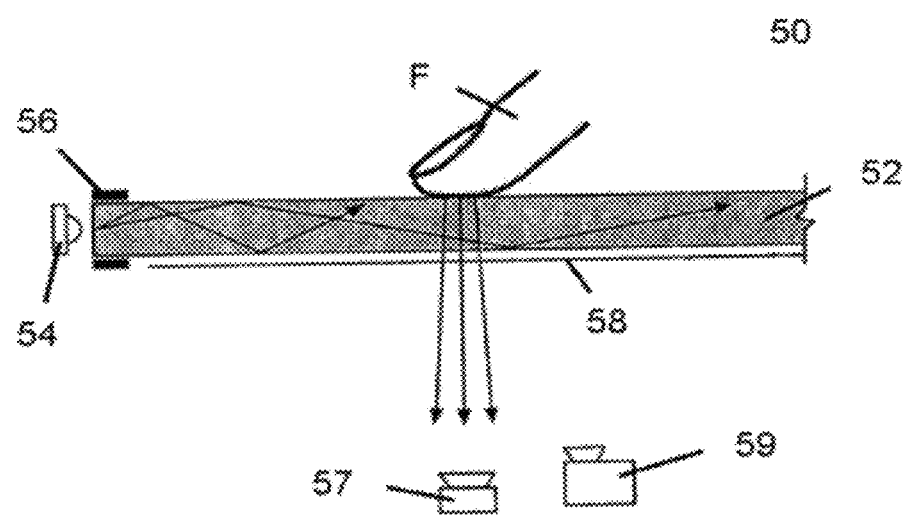
FIG. 1: Prior Art

INTERACTIVE INPUT SYSTEM AND METHOD

FIELD OF THE INVENTION

The present invention relates to input systems and in particular to an interactive input system and method of controlling same.

BACKGROUND OF THE INVENTION

Interactive input systems that allow users to inject input (eg. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the entire contents of which are herein incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of radiation traveling through an optical waveguide is frustrated when an object such as a pointer touches the waveguide surface, due to a change in the index of refraction of the waveguide, causing some radiation to escape from the touch point. In a multi-touch interactive input system, the machine vision system captures images including the point(s) of escaped radiation, and processes the images to identify the position of the pointers on the waveguide surface based on the point(s) of escaped radiation for use as input to application programs.

One example of interactive input system based on FTIR is disclosed in United States Patent Application Publication No. 2008/0179507 to Han. Han discloses a multi-touch sensing display system 50 shown in FIG. 1, employing an optical waveguide 52, a light source 54, light absorbing surface 56 and an imaging sensor 57, such as a camera. Light emitted from light source 54 undergoes total internal reflection within optical waveguide 52. When an object, such as a finger F, is placed in contact with a contact surface of the optical waveguide, total internal reflection is frustrated thus causing some light to scatter from the optical waveguide. The contact will be detected by the imaging sensor. Moreover, a diffuser layer 58 is further disposed on the rear side of the waveguide for displaying images projected by a projector 59 arranged alongside the imaging sensor 57.

United States Patent Application Publication. No. 2008/00284925 to Han discloses an optical waveguide in the form of a clear acrylic sheet, directly against a side of which multiple high-power infrared LEDs (light emitting diodes) are placed. The infrared light emitted by the LEDs into the acrylic sheet is trapped between the upper or lower surfaces of the acrylic sheet due to total internal reflection. A diffuser display surface or a LCD panel is disposed alongside the non-contact side of the acrylic sheet with a small gap between the two in order to keep the diffuser from frustrating the total internal reflection. Imaging sensors mounted orthogonally relative to the waveguide or on the side of an optical wedge beneath the waveguide detects the light escaped from the waveguide. Multi-touch detections are achieved.

United States Patent Application Publication No. 2004/0252091 to Ma et al. discloses a multi-touch interactive input system. Light from two or more light sources mounted on the corner or midpoint of the edge of a touch panel are coupled into a waveguide by a prism to sustain transmission through the waveguide by total internal reflection. The transmitted light is detected by arrays of light detectors around the periphery of the waveguide opposite to each light source. Contacts of objects on the touch panel cause two or more intersecting light beams having known end points to be attenuated, enabling a processor to determine the position and size of the contacts.

United States Patent Application Publication No. 2009/0027357 to Morrison discloses a system of detecting contact on a display employing FTIR. The system includes a planar waveguide associated with a display and includes at least one edge facet and opposing surfaces. The system also includes one or more light emitting diodes such as LEDs coupled to the at least one edge facet for transmitting an optical signal into the waveguide such that the transmitted optical signal is totally internally reflected between the at least one edge facet and opposing surfaces. At least one optical sensing device, such as a camera, positioned substantially to face at least a portion of the edge facet, has a field of view of the entire top surface of the waveguide. Images of the top surface of the waveguide are analyzed to determine the location of contact on the display.

U.S. Provisional Patent Application No. 61/239,057 to McGibney et al., the content of which is incorporated herein by reference, discloses an interactive input system with improved signal-to noise ratio and image capture method. The interactive input system is shown in FIGS. 2A and 2B, and includes an optical waveguide 60 associated with a display having a top surface with a diffuser 62 on it for contact by an object, such as a finger F. The system also includes two light sources. Light from the first light source 64 is coupled into the optical waveguide and undergoes total internal reflection within the waveguide. Light from second light source 66 is directed towards another surface opposite to the top surface (the back surface). At least one imaging device, such as a camera 68, has a field of view looking at the back surface of the waveguide and captures image frames in a sequence with the first light source and the second light source being turned alternately on and off. In this way, processing of images in the sequence can be conducted in a manner that improves the signal-to-noise ratio of the system, so that pointer detected is improved. Like other interactive input systems, with the pointer(s) having been detected, the interaction with the touch surface can be recorded as handwriting or drawing to control execution of the application program, such as the images projected on the diffuser layer 62 by the projector 70.

United States Patent Application Publication No. 2009/0122020 to Eliasson et al. discloses a touch pad system including a radiation transmissive element. The transmissive element includes a first surface being adapted to be engaged by an object so as to reflect/scatter/emit radiation into the element, and a second surface opposite to the first surface. A detecting means is provided on either surface of the transmissive element. A modulation means is provided and adapted to prevent at least part of the reflected/scattered/emitted radiation by the object such that radiation from an object is detected by the detecting means after special modulation of the modulation means. Positions of contact on the surface of the transmissive element can be determined.

U.S. Pat. No. 7,442,914 to Eliasson et al. describes a method and a system for determining the position of a radiation emitter, which radiation emitter may be an actively radiation emitting stylus, pen, pointer, or the like or may be a passive, radiation scattering/reflecting/diffusing element, such as a pen, pointer, or a finger of an operator. Radiation from the emitter is reflected from its position toward the detector by a reflecting element providing multiple intensity spots on the detector thereby providing sufficient information for determining the position. From the output of the detector, the position of the radiation emitter is determined.

Although there are various configurations for an interactive input system to detect touch contact using FTIR technology, most of systems have detecting means such as a camera looking at the back surface of the touch screen, and they require a projector to project images. As a result, such systems are typically very large, are heavy, and are not considered portable.

It is an object of at least one aspect of the present invention to provide a novel interactive input system that can be constructed compactly.

SUMMARY OF THE INVENTION

Accordingly, in one aspect there is provided an interactive input system comprising an optical waveguide, a radiation source directing radiation into the optical waveguide, the radiation undergoing total internal reflection within the optical waveguide in response to at least one touch input on a surface of the optical waveguide, at least one imaging device positioned adjacent to the waveguide, the at least one imaging device having a field of view looking inside the optical waveguide and capturing image frames thereof, and processing structure for processing the image frames captured by the at least one imaging device to determine a location of the at least one touch input based on a frequency of reflections of the radiation appearing in the image frame.

According to another aspect there is provided an interactive input system comprising an optical waveguide within which radiation can be totally internally reflected, the optical waveguide having two parallel surfaces and an image extraction surface extending between the parallel surfaces to permit the radiation reaching the image extraction surface to escape, at least one imaging device having a field of view looking at the image extraction surface to capture image frames thereof, and processing structure for processing the image frames captured by the at least one imaging device to determine a location of the at least one touch input based on a frequency of reflections of the radiation appearing in the image frame.

According to another aspect there is provided a method for determining the location of a pointer in touch contact with an optical waveguide causing radiation within the waveguide to undergo total internal reflection, the method comprising capturing images of the inside of the optical waveguide using at least one imaging device, and processing the images to determine the location of the pointer based on a frequency of reflections of the radiation and an angular position of the reflections with respect to the position of the imaging device.

According to yet another aspect there is provided a method for calibrating an interactive input system comprising displaying at least four predefined calibration points on a display surface positioned below an optical waveguide, capturing an image of the inside of the optical waveguide using at least one imaging device in the event a pointer is brought into touch contact with the at least four predefined calibration points, processing the captured image to identify a pointer angle and a pointer distance away from the at least one imaging device, the pointer angle and pointer distance associated with the touch contact, and determining a numerical relationship between the predefined calibration point and the identified pointer angle and pointer distance.

According to yet another aspect there is provided an interactive input system comprising an optical waveguide within which radiation can be totally internally reflected, the optical waveguide having two parallel surfaces, an extraction block having an input face against a portion of one of the parallel surfaces, wherein the extraction block permits radiation in the optical waveguide that reaches the portion to escape into the extraction block via the input face and to exit the extraction block via an output face, and an imaging device having a field of view looking at the output face and capturing image frames thereof.

BRIEF DESCRIPTION OF THE DRAWINGS

Embodiments will now be described more fully with reference to the accompanying drawings in which:

FIG. 1 is a schematic illustration of an interactive input system that employs frustrated total internal reflection (FTIR) for touch detection;

DETAILED DESCRIPTION OF THE EMBODIMENTS

Figure 2A:
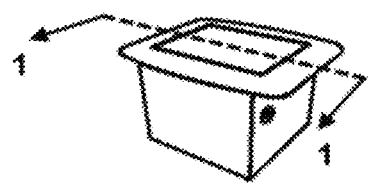
FIG. 2A is a perspective view of a touch table employing the interactive input system of FIG. 1, according to the prior art.
Figure 2B:
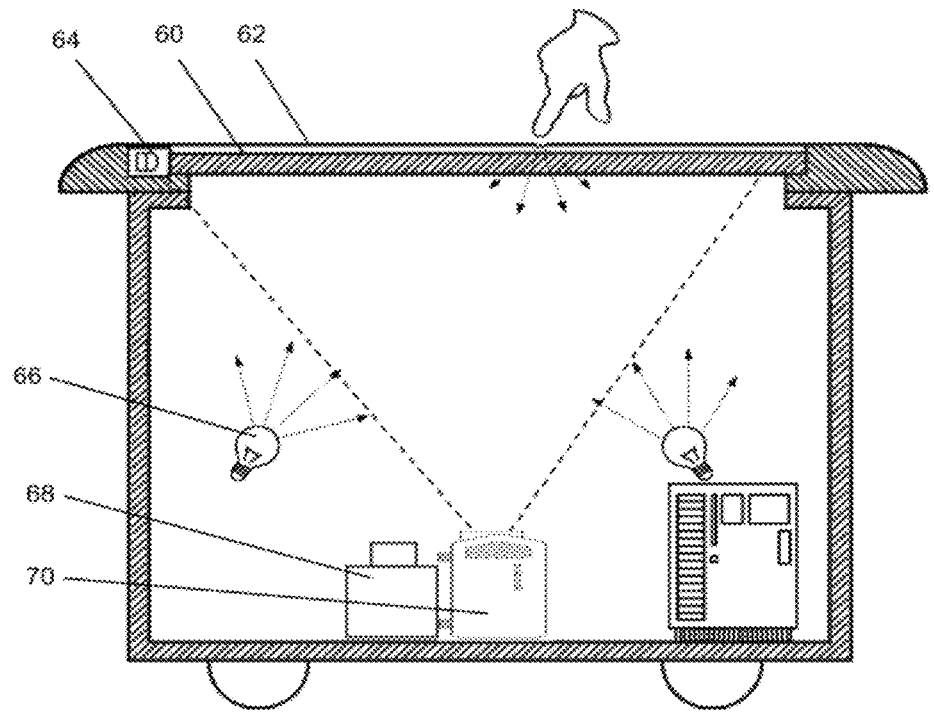
FIG. 2B is a side sectional view of the touch table of FIG. 2A taken along line 1-1, according to the prior art.
Figure 3A:
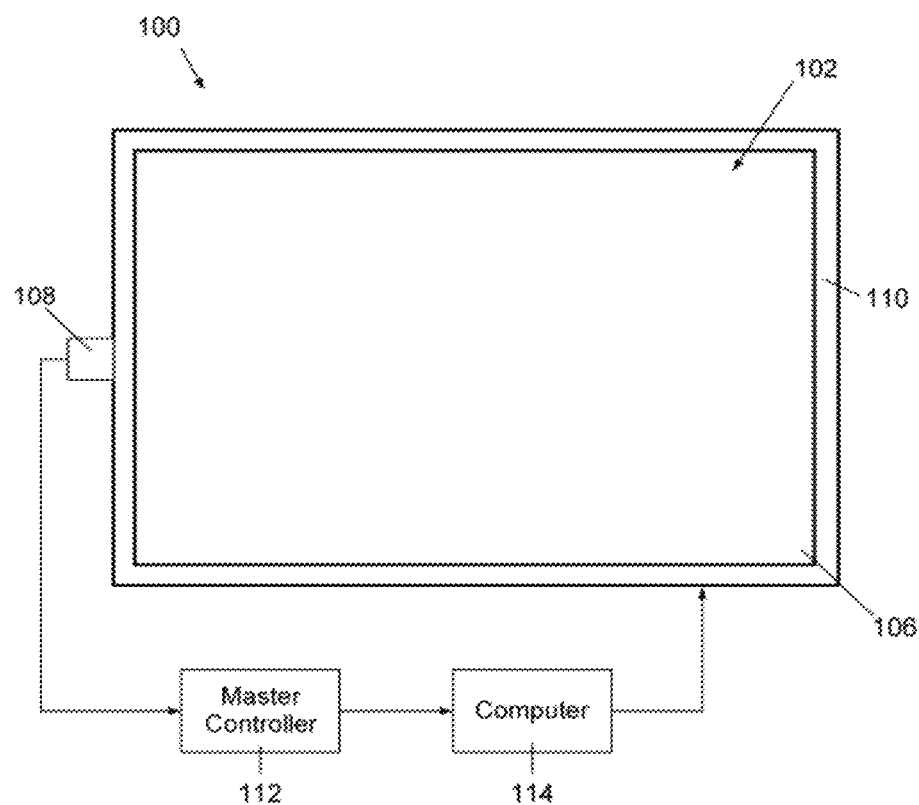
FIG. 3A is a perspective view of an interactive input system according to embodiment of the invention.
Figure 3B:
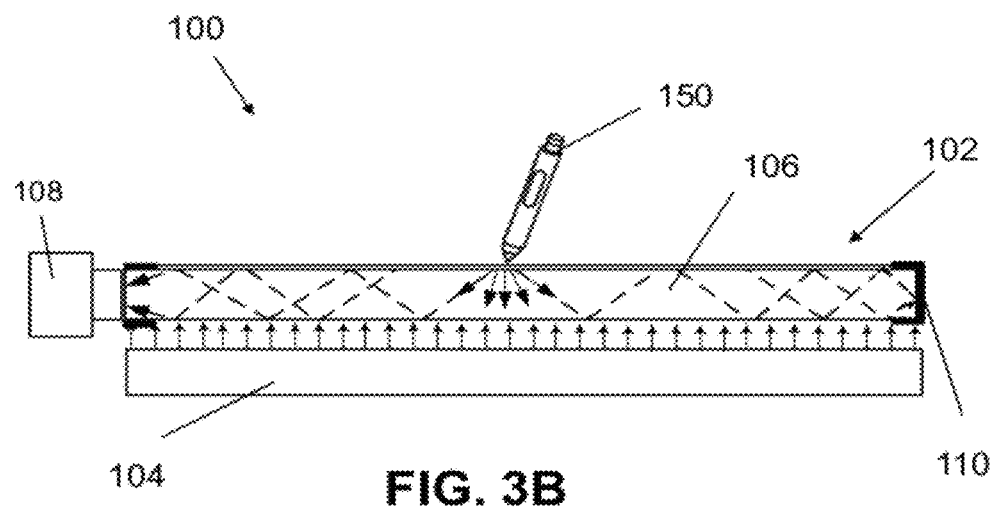
FIG. 3B is a side sectional view of the interactive input system of FIG. 3A.

Turning now to FIGS. 3A and 3B, an interactive input system is shown and generally identified by reference numeral 100. In this embodiment, interactive input system 100 comprises a touch panel 102 mounted atop a display unit 104, such as for example a liquid crystal display (LCD) device or plasma television. Touch panel 102 comprises an optical waveguide 106, which in this embodiment is a sheet of acrylic. The sheet of acrylic is generally rectangular in shape, and has top and bottom planar surfaces. The top and bottom planar surfaces are each generally flat, but include minor surface flaws that enable illumination to be somewhat scattered in the event any illumination is directed towards one of the top and bottom surfaces. A single imaging device 108 for capturing image frames is adjacent the optical waveguide 106 and is positioned approximately midpoint one side of the optical waveguide 106. The imaging device 108 has a field of view looking generally into an end of the optical waveguide 106. That is, the imaging device 108 faces the area through which optical radiation is guided when being totally internally reflected along the waveguide. Positioned about the rest of the periphery of the optical waveguide 106 so as not to occlude the field of view of the imaging device 108 looking into the optical waveguide 106, is a radiation absorbing material 110 such as, for example, black electrical tape. The radiation absorbing material 110 absorbs optical radiation that reaches the edge of the optical waveguide at which the radiation absorbing material 110 is positioned.

Imaging device 108 is in communication with a master controller 112 where image data in captured image frames is processed to determine the location of a pointer in touch contact with the optical waveguide 106, as will be described in further detail herein. The master controller 112 has its own processing structure for processing the image frames, but in this embodiment is also connected to another processing structure such as computer 114 that executes a host application and one or more application programs. Image data generated by the computer 114 is displayed on the display unit 104 and, in combination with pointer location data, the image data reflects pointer activity. In this manner, the computer 114 and display unit 104 allow pointer contact on the surface of the optical waveguide 106 to be recorded as writing or drawing or to be used to control execution of one or more application programs executed by computer 114.

Figure 4:
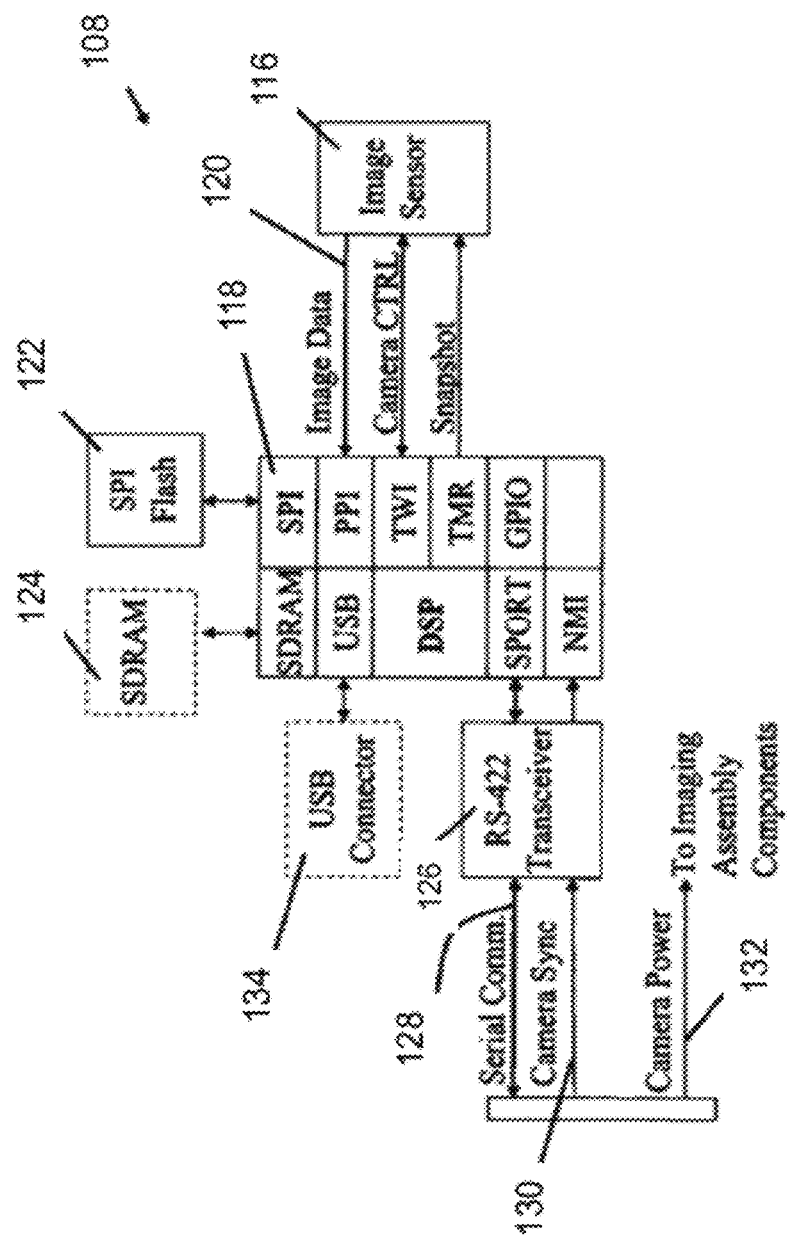
FIG. 4 is a block diagram of components of an imaging device for the interactive input system of FIG. 3A.

Turning now to FIG. 4, a block diagram of components of the imaging device 108 is shown. The imaging device 108 comprises an image sensor 116 such as the Aptina (Micron) MT9V034, that has an image capture resolution of 752×480 pixels. The image sensor 116 is fitted with a two element, plastic lens (not shown) that provides the image sensor 116 with a field of view of approximately 104 degrees. Power for the components of the imaging device 108 is provided on power line 132.

A digital signal processor (DSP) 118, such as that manufactured by Analog Devices under part number ADSP-BF522 Blackfin, communicates with the image sensor 116 over an image data bus 120 via a parallel port interface (PPI). A serial peripheral interface (SPI) flash memory 122 is available to the DSP 118 via an SPI port and stores firmware for image assembly operations. Depending on the size of captured image frames as well as the processing requirements of the DSP 118, the imaging device 108 may optionally comprise synchronous dynamic random access memory (SDRAM) 124 to store additional temporary data. SDRAM 124 is shown with dotted lines. The image sensor 116 also communicates with the DSP 118 via a two-wire interface (TWI) and a timer (TMR) interface. The control registers of the image sensor 116 are populated by the DSP 118 via the TWI in order to configure parameters of the image sensor 116, such as the integration period for the image sensor 116.

In this embodiment, the image sensor 116 operates in snapshot mode. In the snapshot mode, the image sensor 116, in response to an external trigger signal received from the DSP 118 via the TMR interface that has a duration set by a timer on the DSP 118, enters an integration period during which an image frame is captured. Following the integration period, after the generation of the trigger signal by the DSP 118 has ended, the image sensor 116 enters a readout period during which time the captured image frame is available. With the image sensor 116 in the readout period, the DSP 118 reads the image frame data acquired by the image sensor 116 over the image data bus 120 via the PPI. The DSP 118 in turn processes image frames received from the image sensor 116 and provides pointer location information to the master controller 112.

The DSP 118 also communicates with an RS-422 transceiver 126 via a serial port (SPORT) and a non-maskable interrupt (NMI) port. The RS-422 transceiver 126 communicates with the master controller 112 over a differential synchronous signal (DSS) communications link 128 and a sync line 130.

DSP 118 may also optionally be connected to a USB connector 134 via a USB port as indicated by dotted lines. The USB connector 134 can be used to connect the imaging device 108 to diagnostic equipment.

Figure 5:
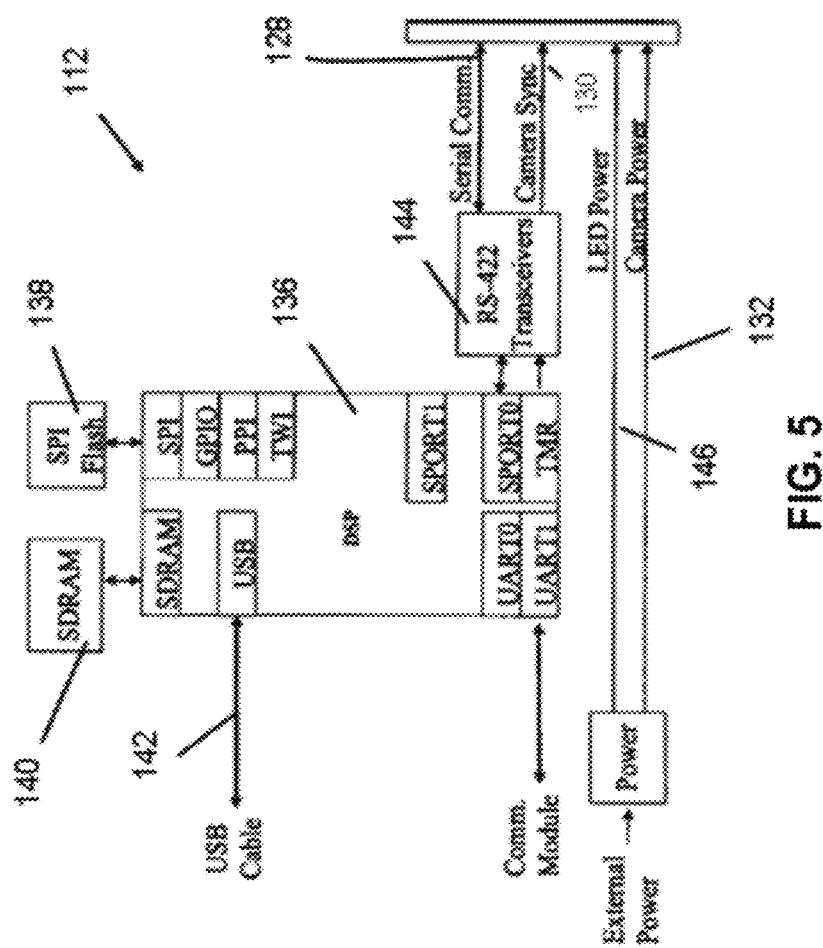
FIG. 5 is a block diagram of components of a master controller for the interactive input system of FIG. 3A.

Components of the master controller 112 are illustrated in FIG. 5. As can be seen, master controller 112 comprises a DSP 136 such as that manufactured by Analog Devices under part number ADSP-BF522 Blackfin. A serial peripheral interface (SPI) flash memory 138 is connected to the DSP 136 via an SPI port and stores the firmware used for master controller operation. A synchronous dynamic random access memory (SDRAM) 140 that stores temporary data for system operation is connected to the DSP 136 via an SDRAM port.

In this embodiment, the DSP 136 communicates with the computer 114 over a USB cable 142 via a USB port (not shown). Furthermore, the DSP 136 communicates through its serial port (SPORT) with the imaging device 108 via an RS-422 transceiver 144 over the differential synchronous signal (DSS) communications link 128. The DSP 136 also communicates with the imaging device 108 via the RS-422 transceiver 144 over the camera synch line 130. In some embodiments as will be described, illumination devices are employed. The illumination devices may be provided with their power via power line 146.

As will be appreciated, the architectures of the imaging device 108 and the master controller 112 are similar. By providing a similar architecture between the imaging device 108 and the master controller 112, the same circuit board assembly and common components may be used for both thus reducing the part count and cost of the overall system. Differing components are added to the circuit board assemblies during manufacture dependent upon whether the circuit board assembly is intended for use in the imaging device 108 or in the master controller 112. For example, the master controller 112 may require a SDRAM 76 whereas the imaging device 108 may not.

The computer 114 in this embodiment is a personal computer comprising, for example, one or more processors, system memory (volatile and/or non-volatile memory), other non-removable or removable memory (eg. a hard disk drive, RAM, ROM, EEPROM, CD-ROM, DVD, flash memory, etc.) and a system bus coupling the various computer components to the processing unit. The computer may also comprise a network connection to access shared or remote drives, one or more networked computers, or other networked devices.

Figure 6:
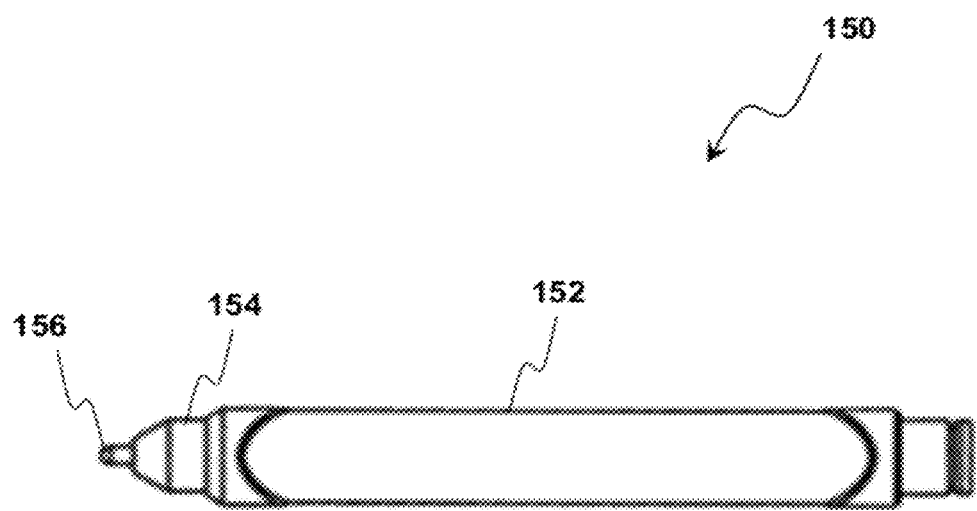
FIG. 6 is a side elevation view of an active pen tool for use as a pointer with the interactive input system of FIGS. 3A and 3B.

In this embodiment, an active pen tool 150 is employed to emit IR radiation into the optical waveguide 106, which IR radiation is detected for use in locating the point at which the active pen tool 150 is positioned. FIG. 6 shows an exemplary active pen tool 150 for use with the interactive input system 100. The pen tool 150 has a main body 152 terminating in a frustoconical tip 154. The tip 154 houses one or more miniature infrared light emitting diodes (IR LEDs) (not shown). The infrared LEDs are powered by a battery (not shown) also housed in the main body 152. Protruding from the tip 154 is an actuator 156 that resembles a nib. Actuator 156 is biased out of the tip 154 by a spring (not shown) but can be pushed into the tip 154 upon application of pressure thereto. The actuator 156 is connected to a switch (not shown) within the main body 152 that closes a circuit to power the IR LEDs when the actuator 156 is pushed against the spring bias into the tip 154. With the IR LEDs powered, the pen tool 150 emits infrared (IR) radiation from its tip 154.

Figure 7:
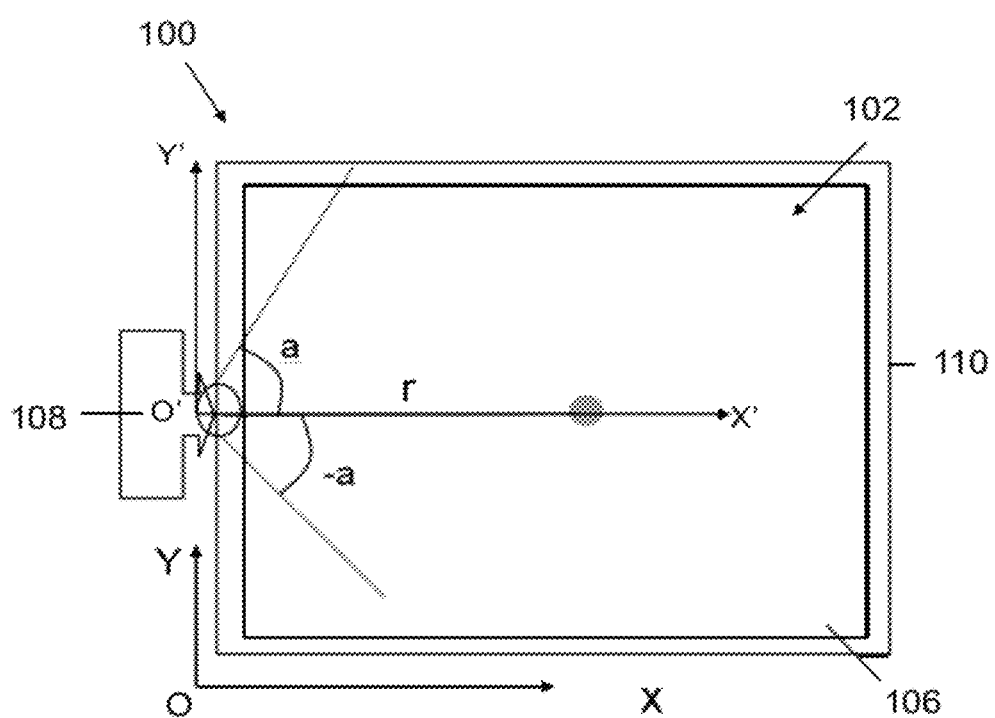
FIG. 7 is a top sectional view of the interactive input system of FIGS. 3A and 3B illustrating the field of view of the imaging device and a point of contact on the touch surface by an active pointer such as the active pen tool of FIG. 6.

As can be seen in FIG. 7, when active pen tool 150 is brought into contact with the touch surface of the optical waveguide 106 at a particular touch point, IR radiation is introduced into the optical waveguide 106. The location of the touch point is a distance r and an angle a from the imaging device 108. For the purpose of calculating the location of the touch point relative to the imaging device 108, a coordinate system is defined as X'O'Y'. For the purpose of calculating the location of the touch point relative to the surface of the optical waveguide 106, the surface of the optical waveguide 106 is defined as a coordinate system XOY. Accordingly, the coordinates of the center of the imaging device 108 relative to the surface of the optical waveguide 106 are defined as $(X_0, Y_0)$. In this embodiment, $X_0=0$, therefore the coordinates of the center of the imaging device 108 are $(0, Y_0)$. The coordinates of the touch point relative to the imaging device 108 are defined as $(X_i', Y_i')$. The coordinates of the touch contact of the active pen tool 150 relative to the surface of the optical waveguide 106 are defined as $(X_i, Y_i)$. The coordinates $(X_i, Y_i)$ of the touch contact relative to the surface of the optical waveguide 106 are calculated based on the coordinates of the touch contact relative to the imaging device 108 ($X_i'$, $Y_i'$) distance r and angle a, as will be discussed below. In the event that the imaging device 108 is positioned at the origin of the XOY coordinate system, the coordinates of the touch contact relative to the surface of the optical waveguide 106 are calculated based on the distance r and angle a, as the coordinates ($X_i'$, $Y_i'$) would be equal to (0, 0).

During operation, when a user contacts the surface of the waveguide 106 with an active pen tool 150, the tip 154 emits IR radiation into the waveguide 106. The IR radiation is scattered into the waveguide by the minor surface flaws on the surface of the waveguide. Most IR radiation entering into the waveguide 106 does not escape through the upper and lower surfaces of the optical waveguide 106 due to total internal reflection (TIR) because its angle of incidence at the upper and lower surfaces is not sufficient to allow it to escape. The IR radiation reaching the periphery of the optical waveguide 106 is absorbed by the radiation absorbing material 110 thereby reducing noise within the optical waveguide 106. It will be understood that the radiation absorbing material 110 also prevents ambient radiation from entering the optical waveguide 106. However, the IR radiation that has been injected into the optical waveguide 106 by the active pen tool 150 that is not absorbed by the radiation absorbing material 110 and that reaches the end of the optical waveguide 106 exits the end of the optical waveguide 106 towards imaging device 108. This IR radiation is captured as image data by the imaging device 108, which image data is communicated to the master controller 112 for processing, as will now be described.

Figure 8:
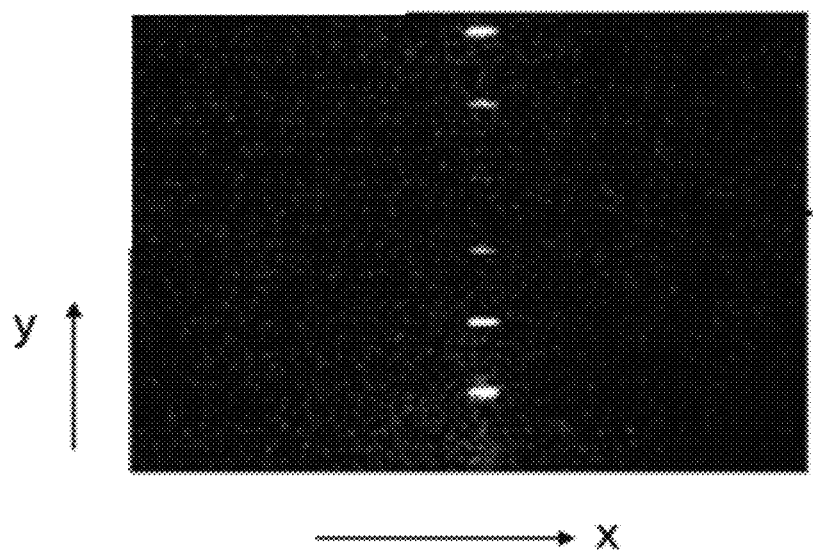
FIG. 8 is an image frame captured by the imaging device of FIG. 7 while an active pointer is contacting the touch surface.

FIG. 8 shows an image frame as captured by the imaging device 108 while the active pen tool 150 is in contact with the surface of the waveguide 106 thereby to introduce IR radiation into the waveguide 106. The image frame is sent to master controller 112 for processing. As will be appreciated, since the imaging device 108 is positioned adjacent to one side of the waveguide 106, the image of one contact point is captured as a series of radiation spots along one line, hereinafter referred to as TIR circles. The series of multiple radiation spots is due to multiple reflections of the radiation having occurred within the optical waveguide 106 prior to reaching the end of the optical waveguide 106 and exiting for capture by the imaging device 108. As can be seen in FIG. 8, a series of six TIR circles appear along a vertical line. The TIR circles correspond to either a direct ray IR radiation emitted from the pen tool 150, or a reflected ray of the IR radiation. As will be discussed below, the further the touch contact is from the imaging device 108, the closer the TIR circles are to one another. That is, the distance of the touch contact from the imaging device 108 is related to the frequency of occurrence of the TIR circles in the captured image.

Similar to the coordinate system defined on the surface of the optical waveguide 106, the image frame is defined as a coordinate system xoy, as shown in FIG. 8.

Figure 9:
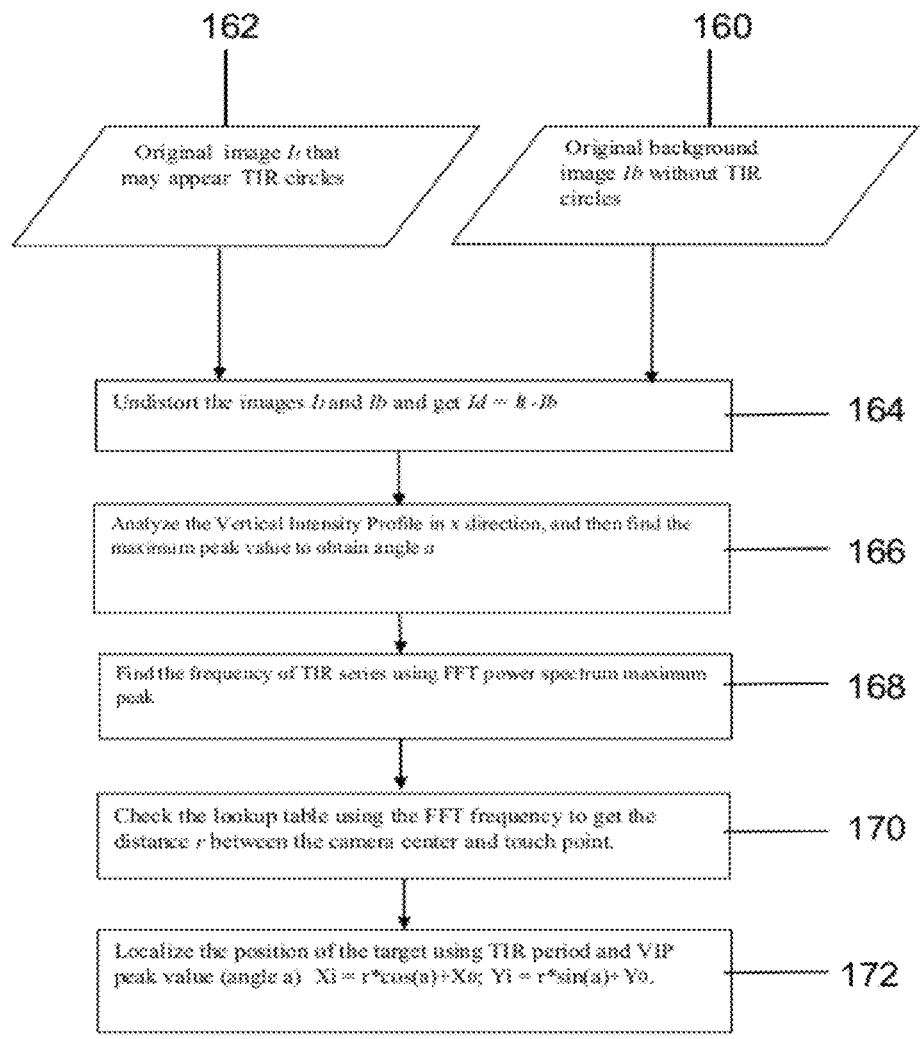
FIG. 9 is a flowchart of a method of determining the location on the touch surface based on the image frame of FIG. 8.

FIG. 9 is a flow chart of a method of calculating the location of the touch point of the pen tool 150 on the touch surface as coordinates ($X_i$, $Y_i$). The method begins with imaging device 108 capturing a background image ($I_b$) of the waveguide 106 when no contacts by a pointer are being made (step 160). The imaging device 108 captures a target image ($I_t$) at step 162. A difference image ($I_d$) is obtained at step 164 by subtracting the background image ($I_b$) from the target image ($I_t$), according to Equation 1, below:

$$I_d = I_t - I_b \quad (1)$$

As will be appreciated, the difference image ($I_d$)) is obtained to eliminate ambient radiation present in the environment in which the system is used. In the event that there is no touch contact such that no non-background IR radiation is being injected into the optical waveguide 106, the difference image ($I_d$) will be blank since the background image ($I_b$) and the target image ($I_t$)) are the same. In this event, the method can be stopped since there is no pointer and no need for further processing of a blank difference image ($I_t$). However, in the event that the difference image ($I_d$) is not blank, the difference image ($I_d$) is further analyzed. More particularly, a vertical intensity profile of the difference image ($I_d$), ($VIP_d$), is calculated by the digital signal processor (DSP) 136 of the master controller 112. The VIP is calculated according to the method disclosed in U.S. Patent Application Publication No. 2009/0277694 to Hansen et al. filed on May 9, 2008 entitled "Interactive Input System and Bezel Therefor", and assigned to the assignee of the subject application, the contents of which are incorporated by reference. In general, the VIP is calculated by summing the intensity values at each pixel column and then normalizing by dividing the total intensity value of each pixel column by the corresponding number of pixel columns. The $VIP_d$ of the difference image ($I_d$) is calculated by taking the target image $VIP_t$ (sum of all pixels in each column of the target image) and subtracting the background image $VIP_b$. An average value ($V_{avg}$)) for the difference image is then calculated as the sum of the difference image $VIP_d$ values divided by the number of columns within the difference image. The difference image $VIP_d$ is smoothed using a Gaussian filter to create a $VIP_{smooth}$. The x coordinate of the image column where the $VIP_{smooth}-V_{avg}$ is of maximum value is then identified.

The located x coordinate is then used to perform a lookup in a calibration table (described below) to determine the corresponding angle a (step 166). Angle a corresponds to the positive angle between the center of imaging device 108 and the touch point on the touch surface.

The Fast Fourier Fransform (FFT) frequency of the TIR series is then determined by applying an FFT (step 168) and identifying the frequency having the highest power. This identified FFT frequency is then used to perform a lookup in a calibration table to determine the corresponding distance r (step 170).

With distance r and angle a having been determined using image processing and lookup tables as described above, the detected coordinates ($X_i$, $Y_i$) of the touch point on the touch surface are calculated (step 172) according to Equations 2 and 3, below:

$$X_i = X_i' + X_0 \quad (2)$$

$$Y_i = Y_i' + Y_0 \quad (3)$$

where:

$X_i' = r^* \cos(a)$;

$Y_i' = r^* \sin(a)$; and $X_0, Y_0$ is the coordinates of the center of the imaging device 108 relative to the surface of the optical waveguide 106, as previously defined.

Figure 10:
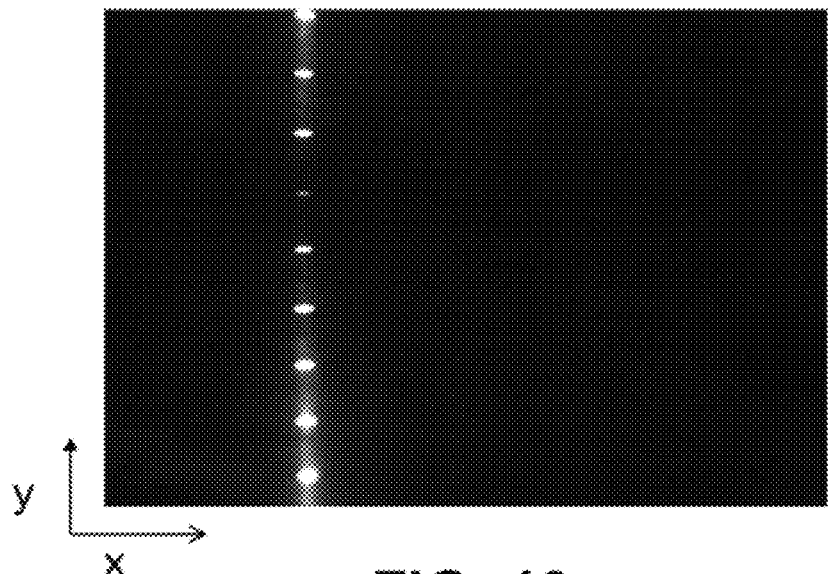
FIG. 10 is a difference image frame calculated based on the captured image frame of FIG. 8.
Figure 11:
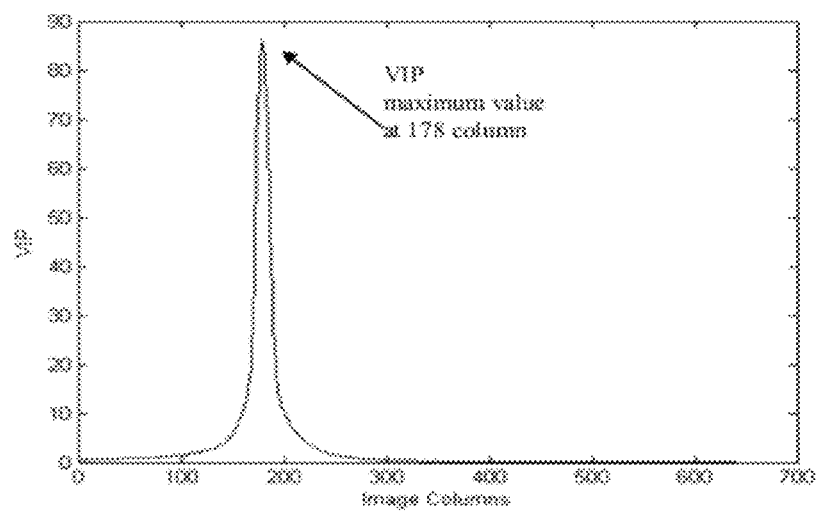
FIG. 11 is a graph of a vertical intensity profile (VIP) of the difference image of FIG. 10.

FIG. 10 shows an exemplary difference image frame ($I_d$) obtained as in step 164 described above. FIG. 11 shows a graph of a VIP corresponding to the difference image frame shown in FIG. 10. In this VIP, the VIP peak position occurs at image column 178 which, in the lookup table, corresponds to an angle of a=11.25°.

Figure 12:
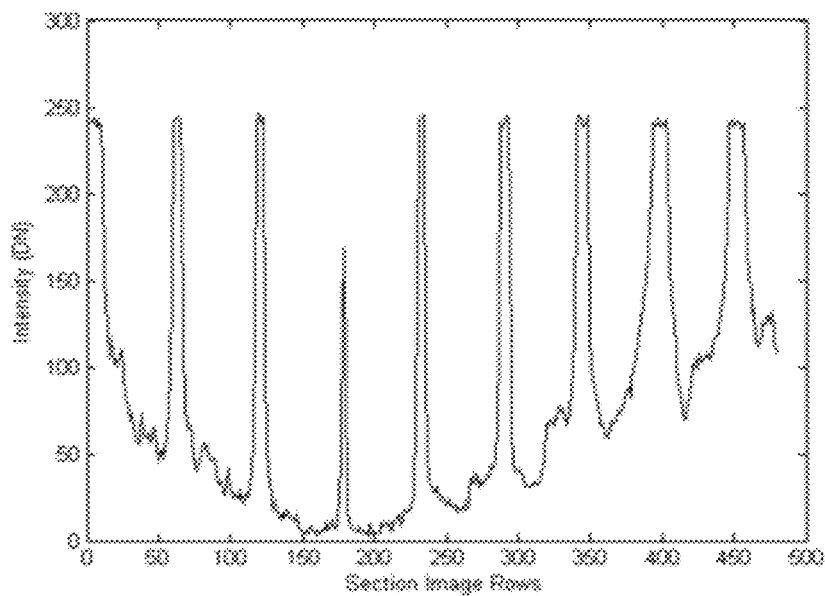
FIG. 12 is a graph of the intensity distribution along the image column corresponding to the peak position of the VIP of FIG. 11.
Figure 13:
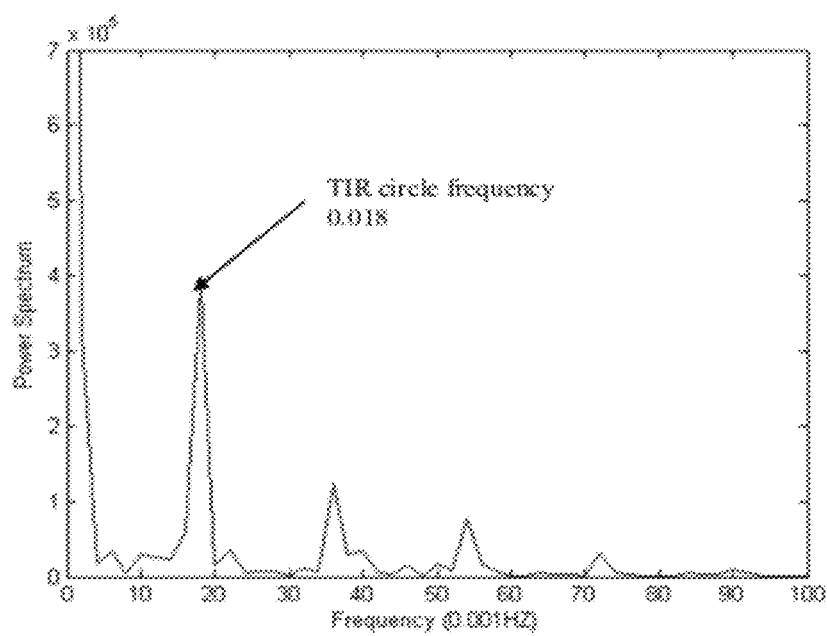
FIG. 13 is a graph of a power spectrum distribution determined from a Fast Fourier Transform (FFT) analysis of the intensity distribution of FIG. 12 used for locating the pointer on the touch surface.

FIG. 12 shows the intensity distribution along the image column corresponding to the peak position of the VIP of FIG. 11. The power spectrum distribution of FIG. 12 as calculated using the FFT analysis is shown in FIG. 13. As can be seen, the maximum power spectrum distribution value corresponds to the TIR circle frequency, which in this embodiment is approximately 0.018 Hz. Using the frequency lookup table configured during system calibration, it is determined that a TIR frequency of 0.018 Hz corresponds to distance of r=200 mm.

In this example, the coordinates of the touch point on the touch surface (X'$_i$, Y'$_i$) with respect to the imaging device 108 in X'O'Y' coordinates were calculated as follows:

$$X'_i = 200 \text{ mm} * \cos(11.25°) = 196.16 \text{ mm}$$

$$Y'_i = 200 \text{ mm} * \sin(11.25°) = 39.02 \text{ mm}$$

The final detected coordinates (Xi, Yi) of the touch point with respect to the touch surface were then calculated according to Equations (2) and (3) as follows:

$$X_i = 200 \text{ mm} * \cos(11.25°) = 196.16 \text{ mm}$$

$$Y_i = 200 \text{ mm} * \sin(11.25°) = 39.02 \text{ mm}$$

where $X_0 = 0$ and $Y_0 = 0$.

The detected coordinates are evaluated by comparing the true location ($X_t$, $Y_t$) of the corresponding test point. The localization error between the detected coordinates and the true location coordinates is calculated by subtracting the true coordinates ($X_t$, $Y_t$) from the final detected coordinates (Xi, Yi).

Five touch points were been tested according to the above method. Table 1 below summarizes the results of the five tested touch contacts on the touch surface.

TABLE 1

| Touch Points | Xt (mm) | Yt (mm) | VIP Peak | f (Hz) | Xi (mm) | Yi (mm) | Local. Error (X) Xi − Xt (mm) | Local. Error (Y) Yi − Yt (mm) |
|---|---|---|---|---|---|---|---|---|
| 1 | 260 | 80 | 126 | 0.024 | 256.06 | 77.97 | −3.94 | −2.03 |
| 2 | 299 | 91 | 130 | 0.028 | 301.12 | 89.53 | 2.12 | −1.47 |
| 3 | 343 | 47 | 225 | 0.031 | 345.94 | 46.16 | 2.94 | −0.84 |
| 4 | 313 | 36 | 243 | 0.028 | 312.48 | 32.31 | −0.52 | −3.69 |
| 5 | 275 | −83 | 493 | 0.026 | 277.1 | −88.31 | 2.1 | −5.31 |

Averaging the absolute values for the localization errors (X) and (Y) shown in the above table yields a result of 2.3 mm and 2.7 mm, respectively. Thus, the method described in FIG. 9 for calculating the coordinates of the touch contact on the touch surface has an average localization error of 2.3 mm for $X_i$ coordinates and 2.7 mm for $Y_i$ coordinates.

As mentioned previously, a predetermined calibration lookup table is used during operation of the interactive input system 100 to obtain values for angle a based on the image column for both the angle a and the distance r corresponding to a specific image column and TIR frequency, respectively. The table is populated using a calibration method, as will now be described.

Figure 14:
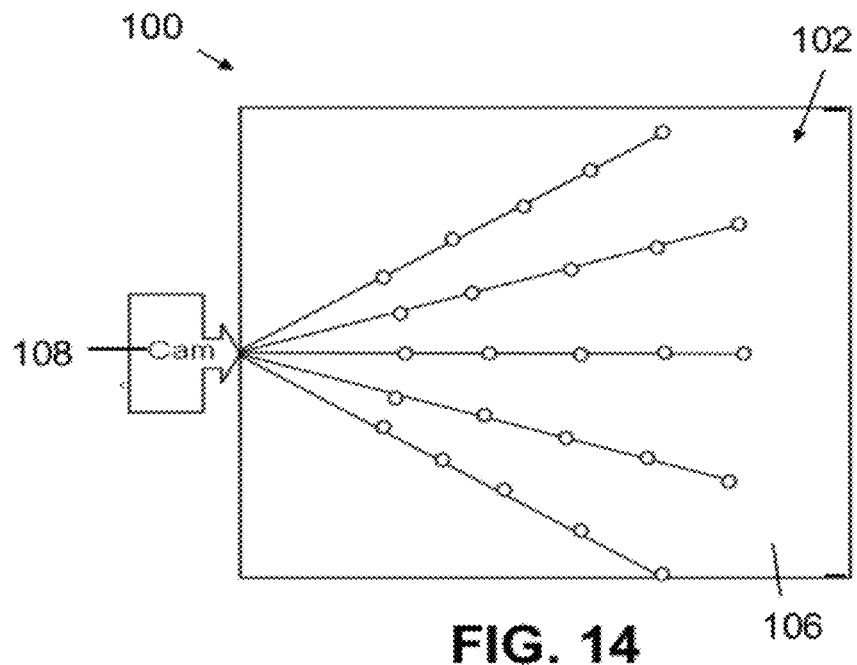
FIG. 14 is a top schematic view of portions of an interactive input system and calibration points for use during a method of calibrating the interactive input system of FIGS. 3A and 3B.
Figure 15:
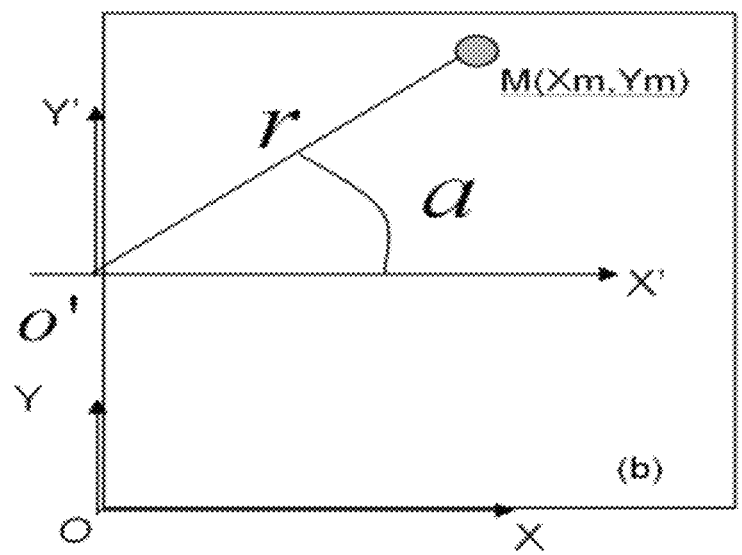
FIG. 15 is a top schematic view of portions of FIG. 14, that illustrates the spatial and geometrical relationship between the imaging device and a calibration touch point M.

Turning to FIGS. 14 and 15, a sample calibration setup is shown in which computer 114 generates a series of calibration points and displays the calibration points on the display unit 104. Because computer 114 is generating the calibration points, the actual coordinates of each calibration point m ($X_m$, $Y_m$), where m=1, 2, . . . , N, are known.

Prior to calibrating the system, the Cartesian coordinates of the center of the imaging device 108 ($X_0$, $Y_0$) are unknown. As will be appreciated, angle a and image column p have a linear relationship. The relationship can be modeled according to Equations 4 and 5, below:

$$a = K_a \times p + b_a; \quad (4)$$

$$a = \arctg\left(\frac{Y_m - Y_0}{X_m - X_0}\right); \quad (5)$$

where:
a is the angle from the center of imaging device 108 to the calibration point;
$K_a$ and $b_a$ are linear parameters; and
p is the image column of the calibration point.

Similarly, distance r and TIR frequency f have a linear relationship. The relationship can be modeled according to Equations 6 and 7, below:

$$r = K_r \times f + b_r; \quad (6)$$

$$r = \sqrt{(X_m - X_0)^2 + (Y_m - Y_0)^2}; \quad (7)$$

where:
r is the distance between the center of imaging device 108 and the calibration point;
$K_r$ and $b_r$ are linear parameters; and
f is the TIR frequency.

During calibration, when the pointer contacts the touch surface at a location corresponding to one of the calibration points being displayed with an active pen tool 150, the tip 154 emits IR radiation into the waveguide 106 from the touch point. The IR radiation does not escape through the upper and lower surfaces of the optical waveguide 106 due to TIR because its angle of incidence at the upper and lower surfaces is not sufficient to allow it to escape. The IR radiation is detected by imaging device 108 and captured as image data which is communicated to the master controller 112 for processing, as described above.

Since the Cartesian coordinates ($X_m$, $Y_m$) of each of the calibration points m are known by the system, all unknown parameters ($X_0$, $Y_0$, $K_a$, $b_a$, $K_r$ and $b_r$) can be calculated using the above equations. For each calibration point m, the image column p and TIR frequency f can be calculated using the image data produced by computer 114 and displayed on display unit 104. In this embodiment, N=6 calibration points are sufficient to accurately calibrate the system.

Figure 16:
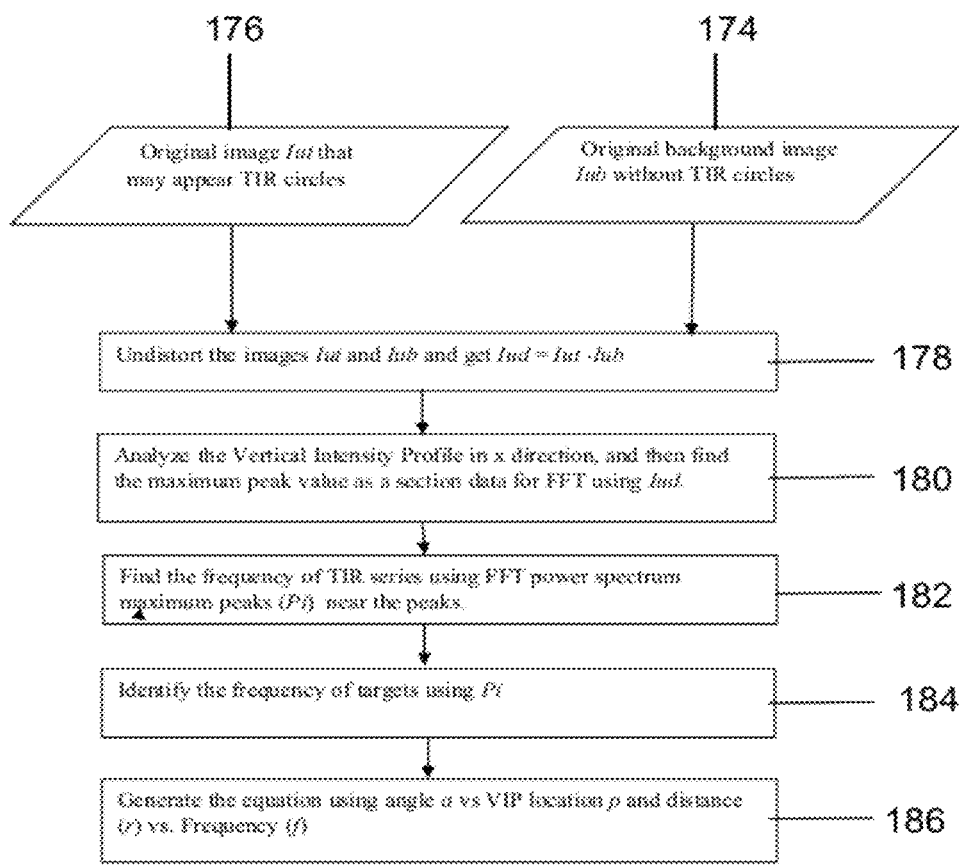
FIG. 16 is a flowchart of a method of calibrating an interactive input system.

FIG. 16 is a flow chart of a method for calibrating the interactive input system that uses the calibration pattern shown in FIG. 14. The method begins with imaging device 108 capturing a background image ($I_{ub}$) (step 174). The imaging device 108 then captures a target image ($I_{ut}$) each time the pen tool 150 contacts one of the calibration points (step 176). A difference image ($I_{ud}$) is obtained at step 178 by subtracting the background image ($I_{ub}$) from the target image ($I_{ut}$).

The difference image ($I_{ud}$) is then analyzed as described above, and the vertical intensity profile (VIP) is calculated. The VIP is then analyzed to determine the VIP maximum value (step 180). The frequency of the TIR series is calculated using FFT power spectrum maximum peaks ($P_i$) (step 182). The frequency f corresponding to each of the calibration points is identified using $P_i$ (step 184). The unknown values ($X_0$, $Y_0$, $K_a$, $b_a$, $K_r$, and $b_y$) are then calculated (step 186) and equations are generated as follows:

$$\text{angle } a \text{ vs. VIP location } p: a = K_a \times p + b_a; \quad (8)$$

$$\text{distance } r \text{ vs. frequency } f \, r = K_r \times f + b_r; \quad (9)$$

Figure 17:
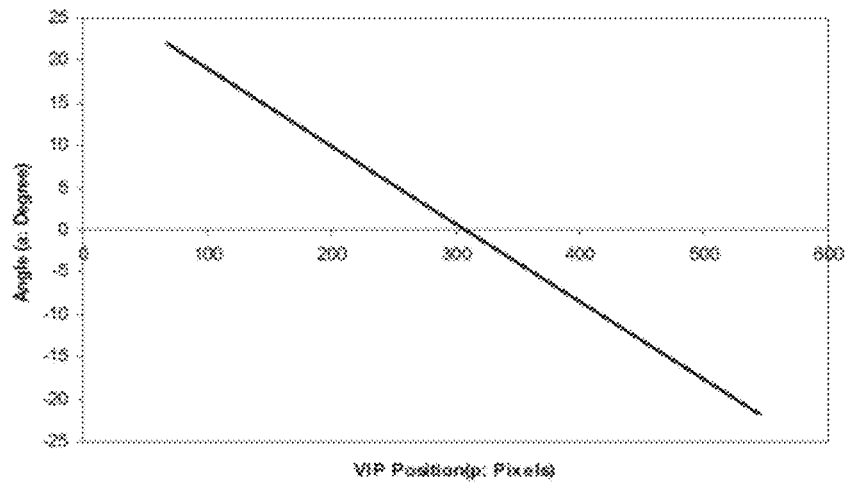
FIG. 17 is a graph illustrating the relationship between Angle a and VIP peak position for the calibration configuration shown in FIG. 15.

As one will appreciate, a linear relationship exists between angle a and VIP location p and can be graphed as shown in FIG. 17. The relationship between angle a and VIP location p is stored in the computer 114 in the form of a calibration lookup table. As described previous, during operation of input system 100, the VIP location p is determined by processing image data, and the corresponding angle a is found in association with the VIP location p within the calibration lookup table.

Figure 18:
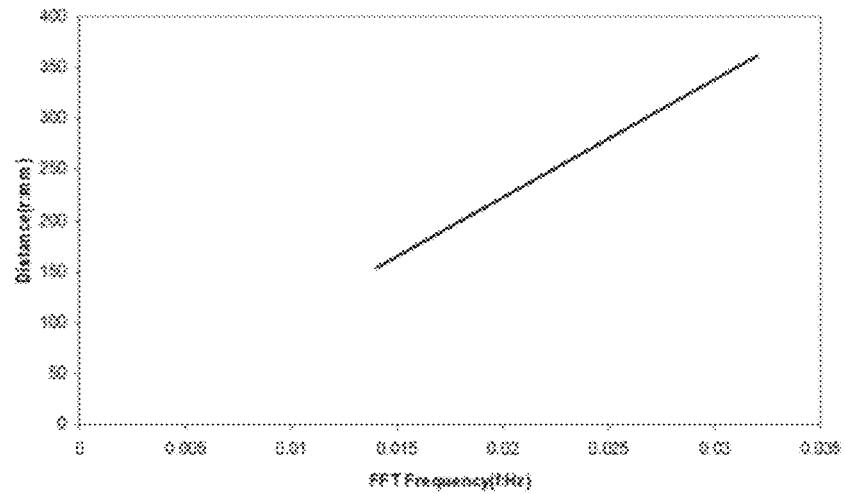
FIG. 18 is a graph illustrating the linear relationship of distance r vs. FFT frequency for the calibration configuration of FIG. 15.

Similarly, a linear relationship exists between distance r and frequency f and can be graphed as shown in FIG. 18. The relationship between distance r and frequency f is also stored in computer 114 in the form of a calibration lookup table. As described previous, during operation of input system 100, the frequency f is determined by processing image data, and the corresponding distance r is found in association with frequency f within the calibration lookup table.

Figure 19:
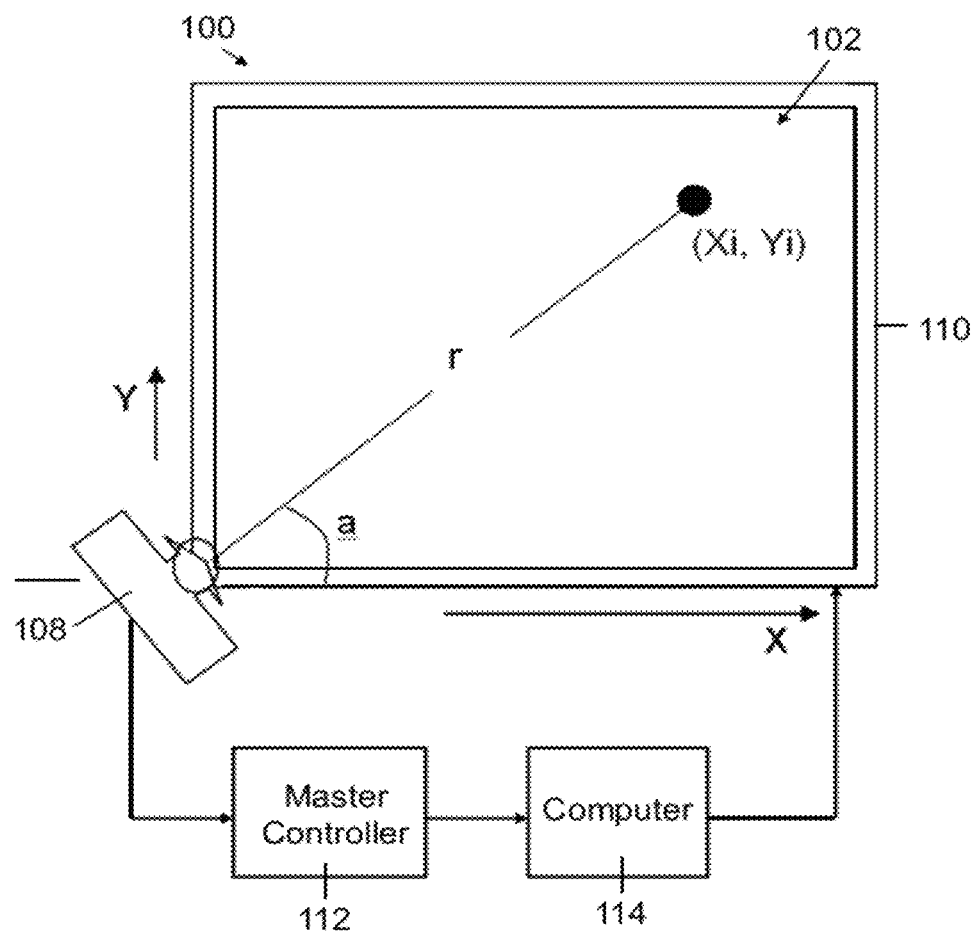
FIG. 19 is a perspective view of an alternative embodiment of an interactive input system.

Turning to FIG. 19, an alternative embodiment of interactive input system 100 is shown. As can be seen, the interactive input system shown in FIG. 19 is similar to that shown in FIG. 3A, however the imaging device 108 is positioned at the corner, or origin (0, 0), of the touch surface. In this embodiment, the coordinates of the touch point ($X_i$, $Y_i$) on the touch surface are calculated according to Equations 10 and 11, below:

$$X_i = r^* \cos(a) \quad (10)$$

$$Y_i = r^* \sin(a) \quad (11)$$

Although the systems described above detected locations of touch points of an active pen tool based on IR radiation being emitted by the active pen tool, alternatives are available. For example, the principles described above may be used to detect location of a touch of a passive pointer such as a finger or a pen, as will now be described.

Figure 20:
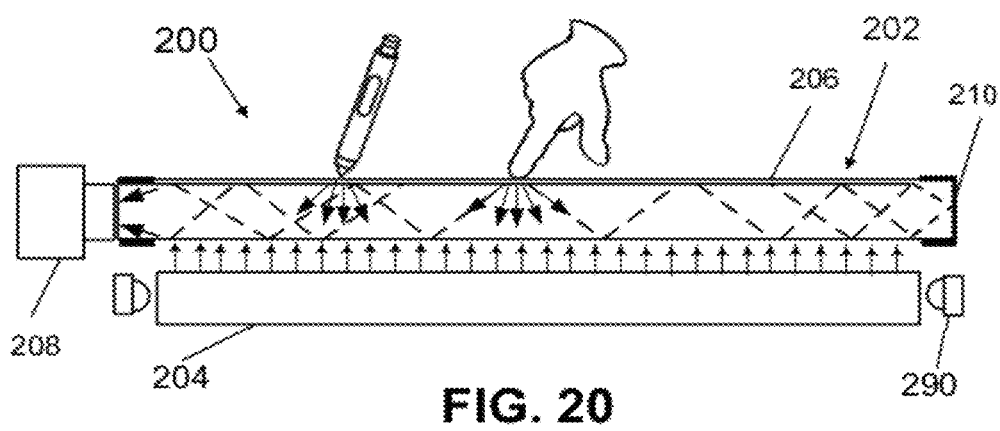
FIG. 20 is a side sectional view of the interactive input system of FIG. 19.

Turning now to FIG. 20, an alternative interactive input system is shown and is generally identified by reference numeral 200. Interactive input system 200 is similar in several ways to interactive input system 100 described above. However, interactive input system 200 includes a radiation source 290 positioned below an optical waveguide 206, and adjacent the display unit 204. In this embodiment, the radiation source 290 comprises a series of IR LEDs arranged along two sides of the display unit 204. The IR LEDs 290 are configured to direct IR radiation into the optical waveguide 206 through the display unit 204. The IR radiation provides backlighting for the passive pointer. Alternatively, the IR LEDs 290 may be arranged about the periphery of the display unit 204, positioned under the display unit 204 at discrete points, or positioned between the waveguide 206 and the display unit 204.

Like in embodiments described above, the imaging device 208 may be positioned similar to that shown in FIG. 3A or FIG. 19.

In operation, when a passive pointer, such as a finger or a pen, contacts the touch surface on the waveguide 206, IR radiation passing through the optical waveguide 206 without generally being totally internally reflected will reach the touch point and then be reflected back from the pointer into the optical waveguide 206 and scattered somewhat as described above. In this way, the reflected IR radiation then undergoes total internal reflection (TIR) within the waveguide 206 and can thereafter be detected by an imaging device 208 in captured image frames to determine the location of the pointer on the touch surface, and so forth as described above.

Although systems have been described that employ a single imaging device positioned adjacent to an optical waveguide, additional imaging devices may be employed. For example, in general, two imaging devices may be positioned at coordinates ($X_{o1}$, $Y_{o1}$) and ($X_{o2}$, $Y_{o2}$) and the system configured to use the image frames captured to detect multiple touch points from multiple pointers, passive or active.

Figure 21:
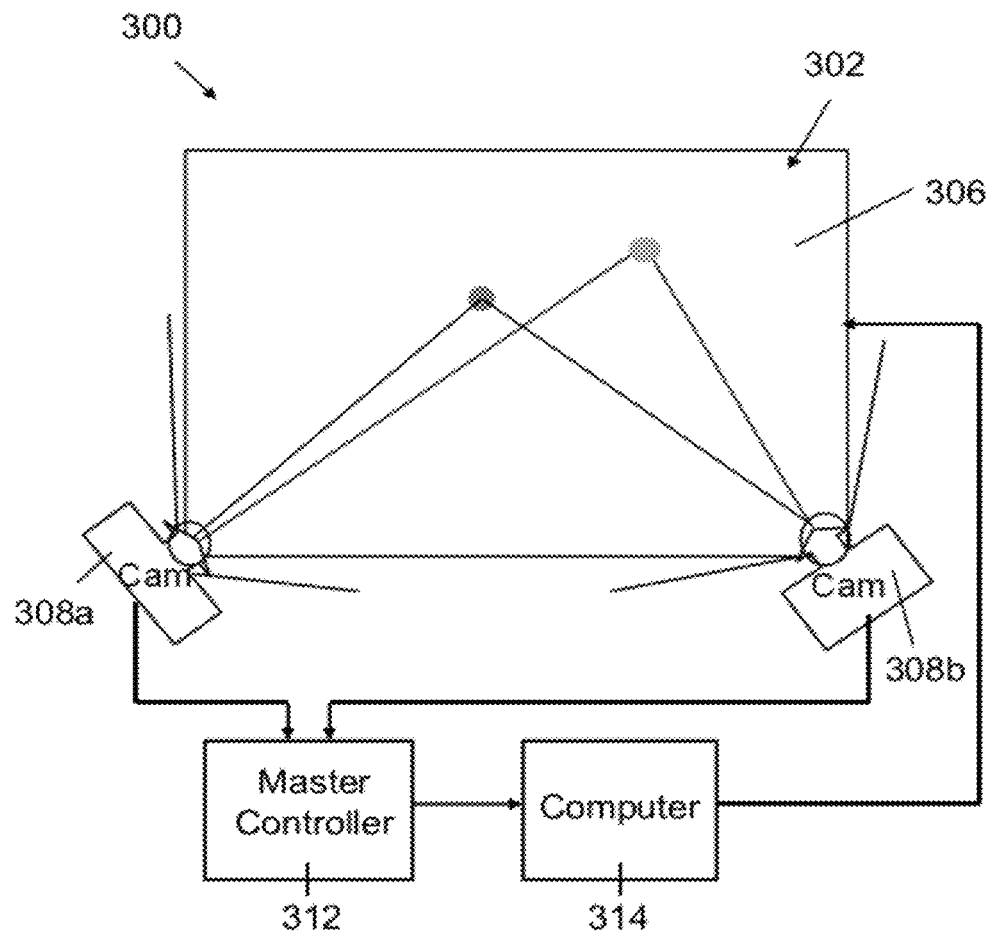
FIG. 21 is a perspective view of another alternative embodiment of an interactive input system.

For example, in FIG. 21, an alternative interactive input system is shown and is generally identified by reference numeral 300. Interactive input system 300 comprises two imaging devices 308a and 308b positioned at location coordinates (0, 0) and ($X_{o2}$, 0). That is, imaging devices 308a and 308b are positioned at respective corners of the optical waveguide 306. Imaging devices 308a and 308b each have a field of view looking generally into the optical waveguide 306. Imaging devices 308a and 308b each capture image data which is communicated to the master controller 312 for processing, as will now be described.

Figure 22:
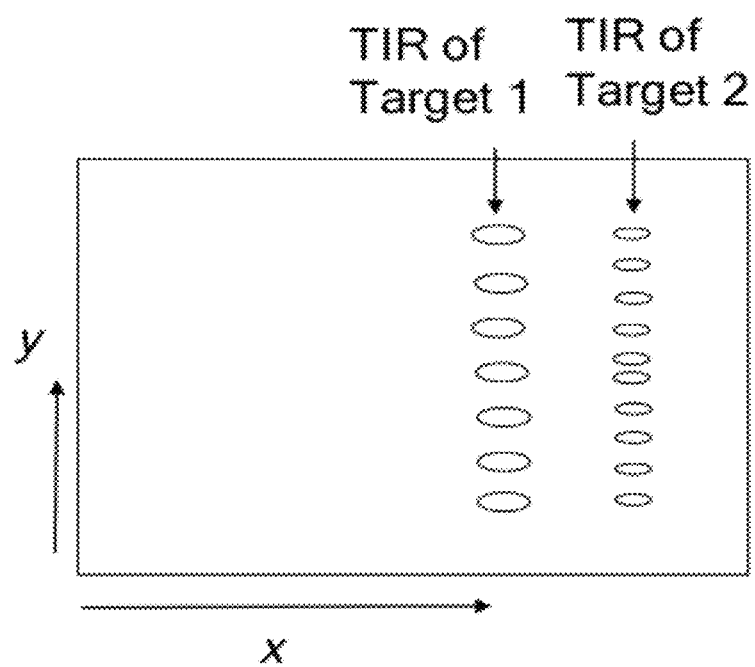
FIG. 22 shows an exemplary image frame captured by an imaging device of FIG. 21.

FIG. 22 is an image frame captured by imaging device 308a in the event that two touch contacts are detected on the display surface. As can be seen, two series of TIR circles are captured. As shown, Target 1 produces of a series of seven TIR circles in the image frame, and Target 2 produces a series of ten TIR circles. In this embodiment, the distances between the TIR circles of Target 2 are smaller than those of Target 1, indicating that Target 2 is located further away from the imaging device 308a than Target 1. Accordingly, the TIR circles of Target 2 have a higher frequency than the TIR circles of Target 1.

Figure 23:
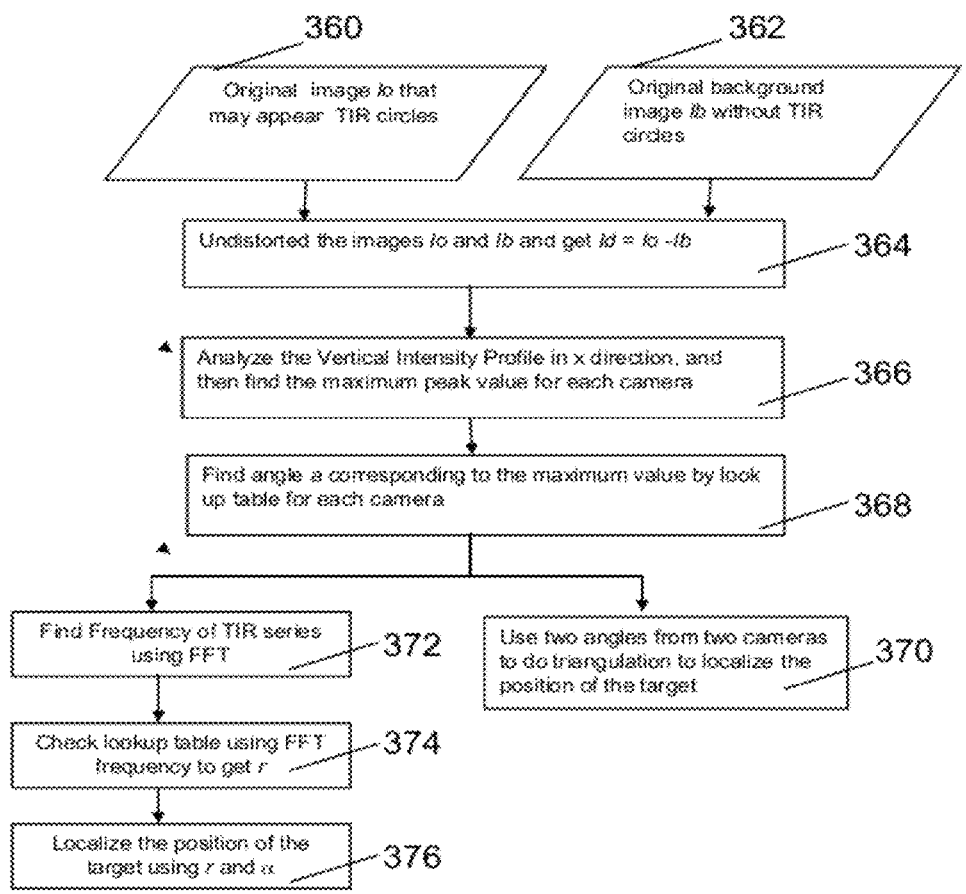
FIG. 23 is a flowchart of a method of calculating the location of multiple touch contacts on the touch surface of the optical waveguide of FIG. 21.

FIG. 23 is a flow chart showing a method of determining the location of the multiple touch points on the touch surface. Similar to the embodiment described above with reference to FIG. 9, the method begins with obtaining a target image (step 360) and a background image (step 362) for each imaging device 308a and 308b, and calculating a difference image for each imaging device by subtracting the background image from the target image (step 364). The difference image is analyzed and the vertical intensity profile (VIP) is calculated for each imaging device. The VIP is analyzed to determine the VIP maximum value. The image column at which the VIP maximum value is located is obtained (step 366). The image column is then used along with a predetermined calibration table to lookup the value of angle a (step 368) for each touch contact.

The image processing and analysis is conducted for corresponding image frames captured by imaging devices 308a and 308b. Since the angle a of each touch contact relative to each imaging device 308a, 308b and the position of each imaging device with respect to each other and the touch surface is known, the coordinates of both touch points can be calculated using triangulation (step 370) as shown in the right-bottom side of FIG. 23, without resorting to the FFT procedures described above.

The details of an exemplary calibration method for input system 30 is described in U.S. Pat. No. 7,692,625 to Morrison et al. filed on Jul. 5, 2001 entitled "Camera-based Touch System" and assigned to the assignee of the subject application, the contents of which are incorporated herein by reference.

Alternatively, the coordinates of each touch contact can be calculated using an FFT analysis, as shown in the left-bottom side of FIG. 23. In this embodiment, the FFT frequency of each TIR series is found using FFT analysis (step 372). The FFT frequency is then used to lookup in a predetermined calibration table the value of distance r for each touch contact (step 374). Distance r corresponds to the distance from the center of the particular imaging device to the touch point on the touch surface. Since the distance and angle from each touch contact to each imaging device is known, the coordinates of each touch contact can be calculated (step 376).

Figure 24:
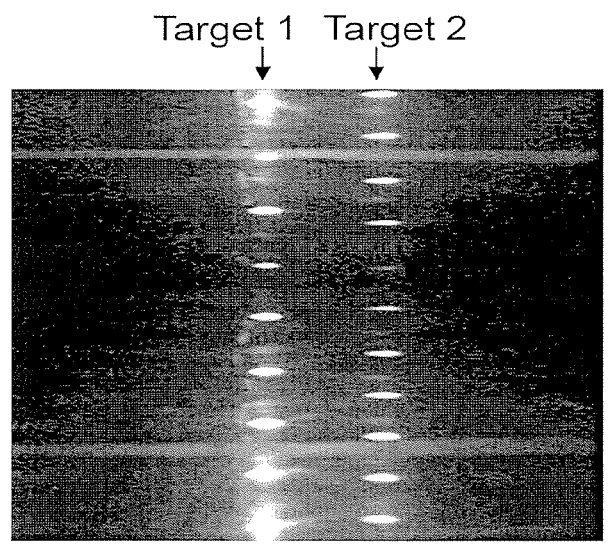
FIG. 24 shows a difference image frame calculated from the captured image frame of FIG. 22.
Figure 25:
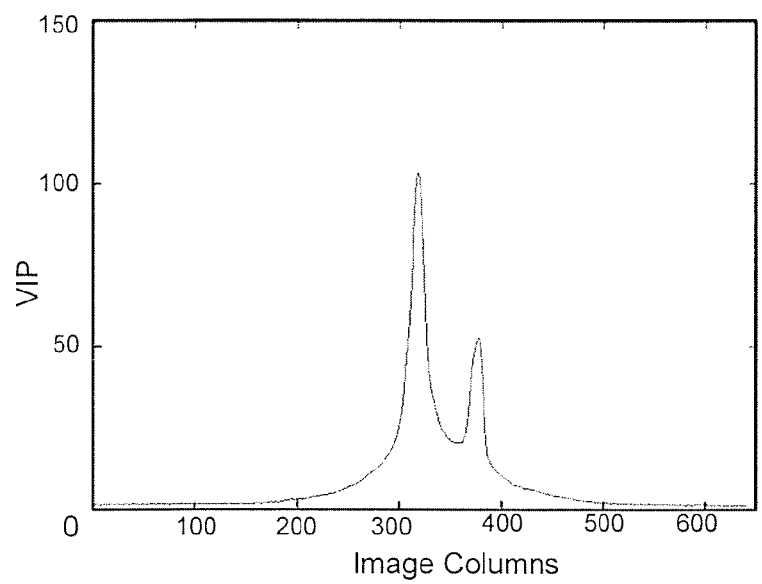
FIG. 25 is a graph showing the vertical intensity profile (VIP) of FIG. 24.

FIG. 24 is a schematic view of a difference image frame calculated by master controller 312 according to step 364 and based on image data obtained by imaging device 308a. As can be seen, there are two series of TIR circles corresponding to a first touch and a second touch contact on the touch surface. The difference image is analyzed and the VIP is calculated and shown in FIG. 25. The VIP is analyzed to determine the VIP maximum values, corresponding to both the first and second touch points. As can be seen, the image column at which the VIP maximum value is located for the first touch point is 317 and the image column at which the VIP maximum value is located for the second touch point is 377.

Figure 26:
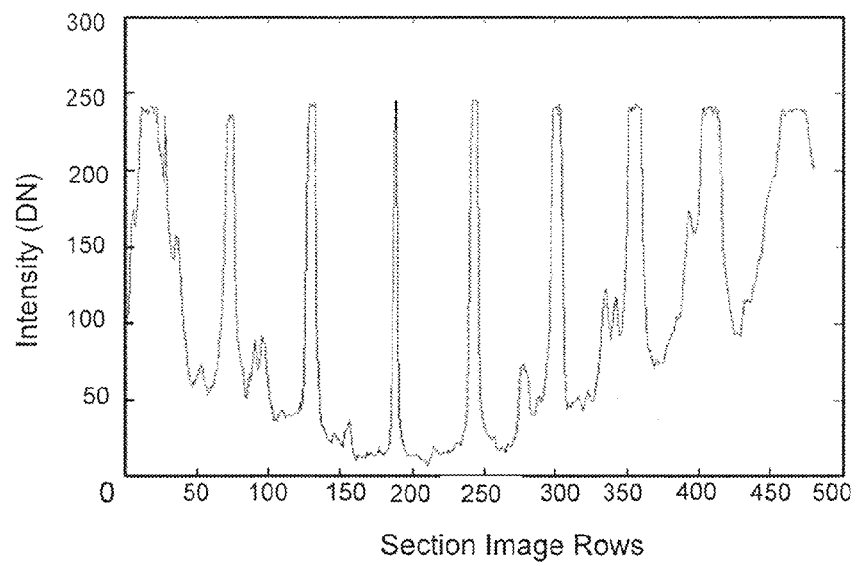
FIG. 26 is a graph showing the intensity distribution along the image column that corresponds to the peak position of the VIP for Target 1 of FIG. 24.
Figure 27:
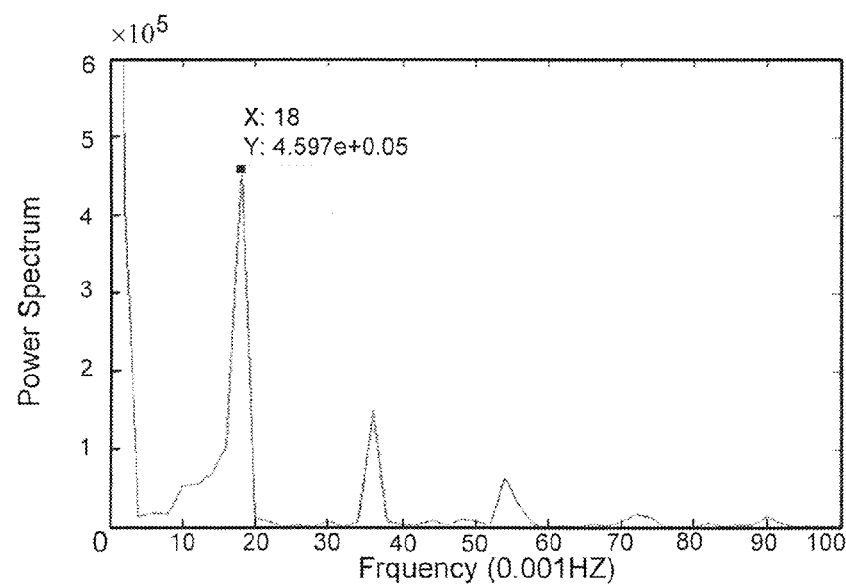
FIG. 27 is a graph showing a power spectrum distribution of Target 1 after FFT analysis of FIG. 26.

FIG. 26 shows the intensity distribution along the image column corresponding to the peak position of the VIP for Target 1 of FIG. 24. The power spectrum distribution of FIG. 26 is calculated using FFT analysis, and is shown in FIG. 27. As can be seen, the maximum power spectrum distribution value corresponds to the TIR circle frequency for the first touch contact, which in this embodiment is approximately 0.018 Hz.

Figure 28:
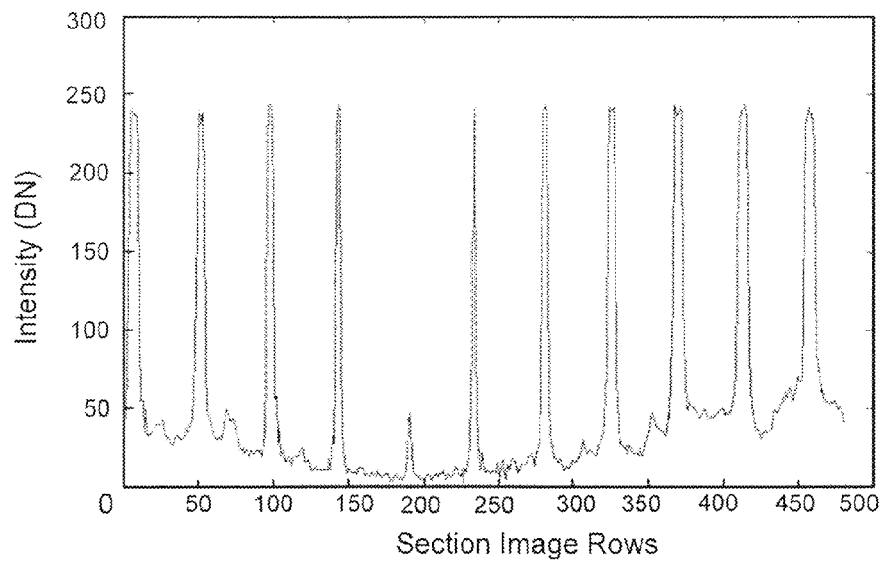
FIG. 28 is a graph showing the intensity distribution along the image column corresponding to the peak position of the VIP for Target 2 of FIG. 24.
Figure 29:
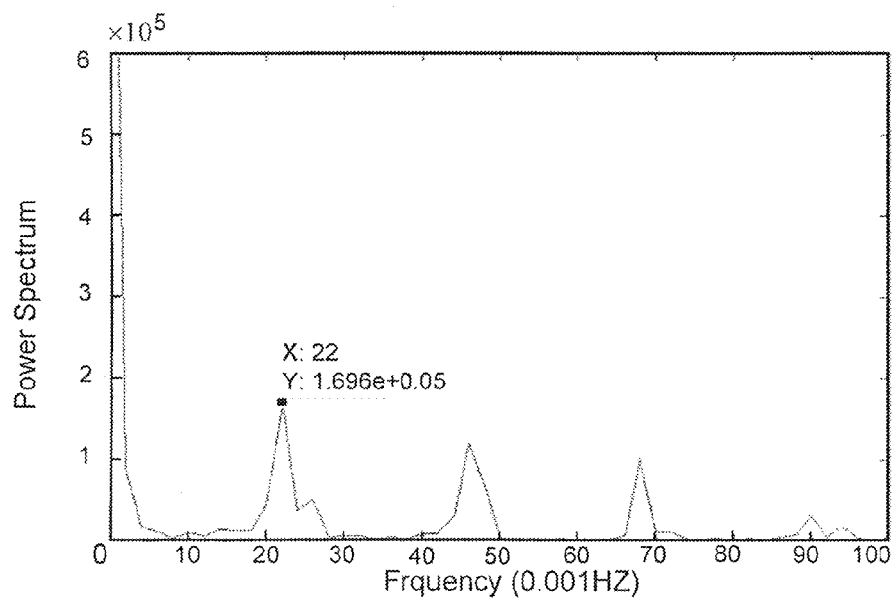
FIG. 29 is a graph showing a power spectrum distribution of Target 2 after FFT analysis of FIG. 28.

Similarly, FIG. 28 shows the intensity distribution along the image column corresponding to the peak position of the VIP for Target 2 of FIG. 24. The power spectrum distribution of FIG. 28 is calculated using FFT analysis, and shown in FIG. 29. As can be seen, the maximum power spectrum distribution value corresponds to the TIR circle frequency for the second touch contact, which in this embodiment is approximately 0.022 Hz.

The coordinates of the first and second touch contact are found by looking up the corresponding distances and angles from the first and second touch contacts to each imaging device, and determining the Cartesian coordinates as described above. Alternatively, the coordinates of the first touch point and the second touch point may be calculated using triangulation once the angles of the first and second touch contacts relative to each imaging device are known.

Figure 30:
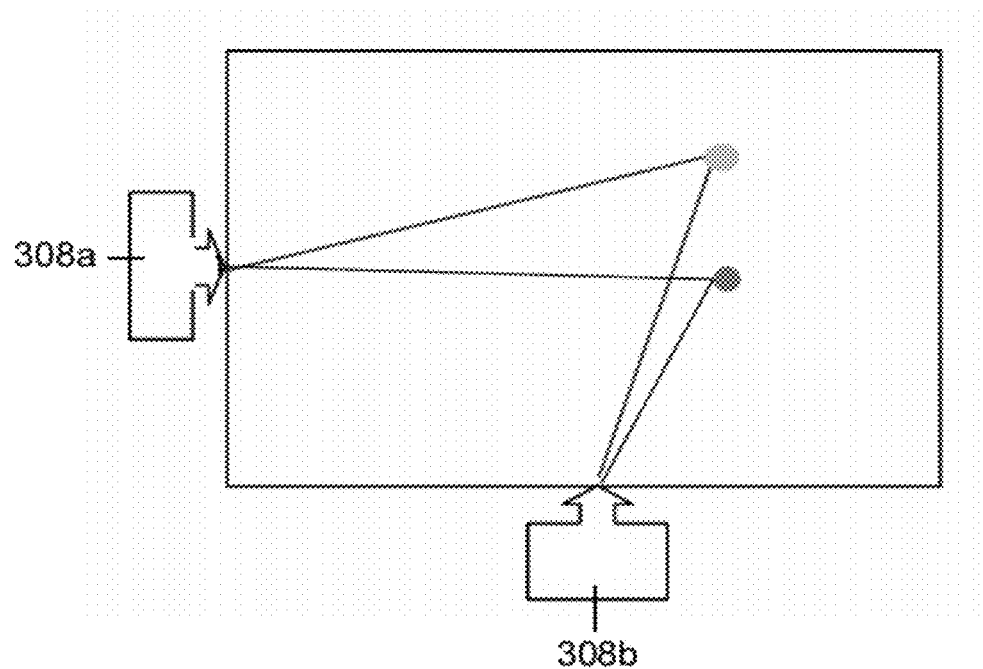
FIG. 30 is a perspective view of another alternative embodiment of an interactive input system.

Turning now to FIG. 30, another alternative embodiment of an interactive input system is shown. In this embodiment, imaging devices 308a and 308b are positioned at coordinates $(0, Y_{O1})$ and $(X_{O2}, 0)$, respectively. As will be appreciated, the coordinates of pointers brought into touch contact with the display surface can be calculated in a manner that is similar to that described above.

Figure 31:
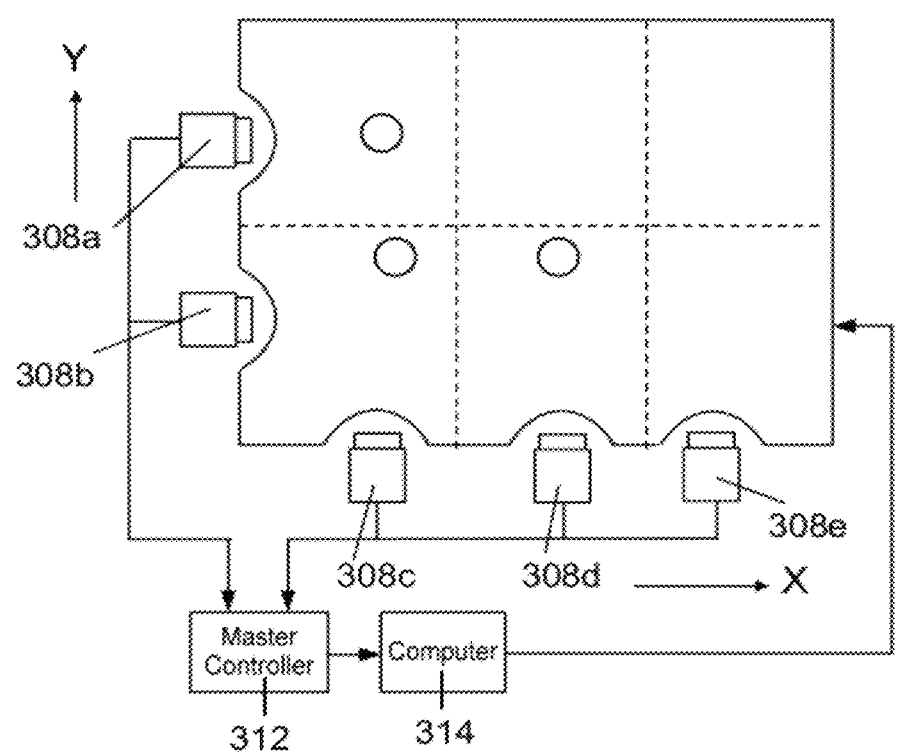
FIG. 31 is a perspective view of another alternative embodiment of an interactive input system.

FIG. 31 shows another alternative embodiment of an interactive input system that is capable of detecting the location of multiple touch points on a touch surface. In this embodiment, five cameras 308a to 308e are positioned adjacent to the optical waveguide and are configured to look generally into the optical waveguide. As will be appreciated, the coordinates of multiple pointers in touch contact with the display surface can be calculated based on the principles described above.

Although the coordinates of two pointers in touch contact with the display surface are calculated based on the angle and distance away from the imaging devices, those skilled in the art will appreciated that the coordinates may be calculated using alternative methods. For example, a projective transform matrix may be used to calculate the coordinates such as that described in above-incorporated U.S. Pat. No. 7,692,625 to Morrison et al.

Although the power spectrum distribution is calculated using FFT analysis, those skilled in the art will appreciate that other frequency domain analysis methods may be employed to find the frequency of the TIR circles. For example, autoregressive modeling or wavelet transformations may be used.

Figure 32:
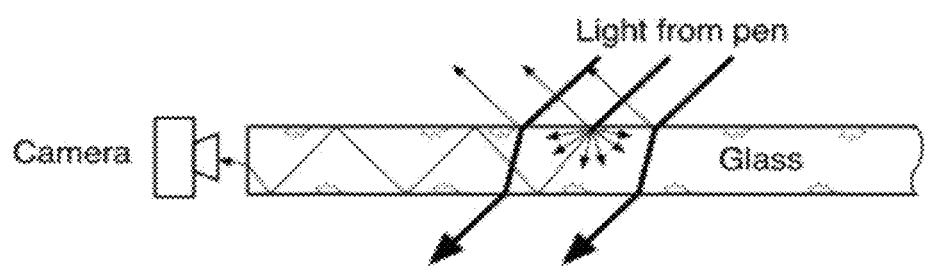
FIG. 32 is a side sectional view of an alternative optical waveguide for use with an interactive input system.

Although the top and bottom surfaces of the optical waveguide are described as having minor surface flaws which help to enable TIR, the top and bottom surfaces of the optical waveguide may be configured to introduce more significant surface flaws, thereby increasing the amount of illumination entering into the optical waveguide that can be totally internally reflected. As example is shown in FIG. 32. In this embodiment, the top and bottom surfaces of the optical waveguide have been treated by sandblasting to introduce small pits on the top and bottom surfaces that scatter IR radiation at sufficient angles to achieve TIR. One or both of the top and bottom surfaces may be treated by sandblasting to achieve the effect of strengthening the amount of illumination that enters into the optical waveguide.

Figure 33:
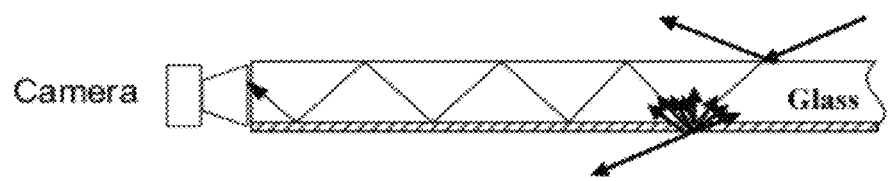
FIG. 33 shows another alternative embodiment of an optical waveguide for use with an interactive input system.

Another embodiment of configuring the top and bottom surfaces of the optical waveguide to introduce more surface flaws is shown in FIG. 33. In this embodiment, a plastic film is applied to the bottom surface of the optical waveguide. When the illumination hits the plastic film, at least some of the radiation is reflected and scattered off of the plastic film back into the optical waveguide, thereby increasing the amount of radiation within the optical waveguide. As will be appreciated, the plastic film may alternatively be applied to the top surface or to both the top and bottom surfaces of the optical waveguide.

Figure 34A:
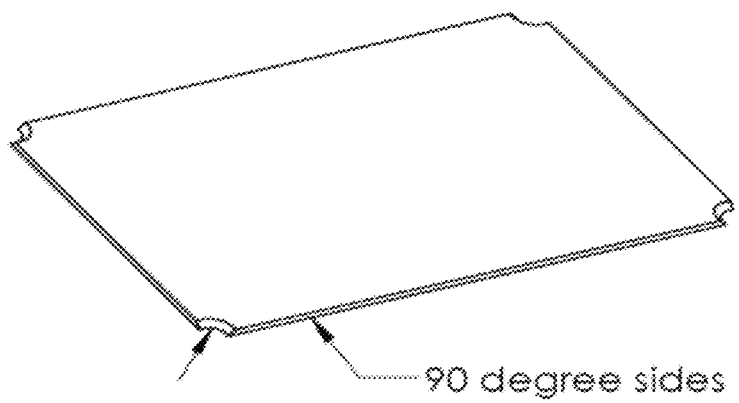
FIGS. 34A and 34B are top perspective and side views of another alternative embodiment of an optical waveguide for use with an interactive input system.
Figure 34B:

FIGS. 34A and 34B show another embodiment of an optical waveguide to be employed with an interactive input system such as that described above. In this embodiment, while the optical waveguide is generally rectangular in shape, its corners have been configured with semicircular cutaways to each accommodate a respective imaging device. As can be seen particularly in FIG. 34B, it is also the case that each semicircular cutaway has been conically cut at an angle of approximately 45 degrees with respect to the touch surface. Similar to FIG. 19, an imaging device can be positioned adjacent a respective one of the semi-circular shaped corners, with the lens of the imaging device being brought to face the 45 degree angle surface of the semi-circular corner. More particularly, the imaging device is positioned so that the optical axis of the lens is oriented perpendicular to the 45 degree surface. Similar to the embodiments described above, the IR radiation that is not absorbed by the radiation absorbing material is detected by the imaging device and captured as image data. Augmenting the optical waveguide to have corners that are semi-circular in shape enables the imaging device to have a view of the entire optical waveguide surface, and the 45 degree angle enables the imaging device to capture more escaping IR radiation than would a 90 degree angle.

Figure 35A:
FIGS. 35A and 35B are top and side views of another alternative embodiment of an optical waveguide for use with an interactive input system.
Figure 35B:
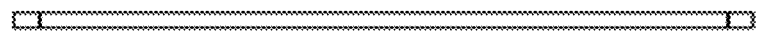

FIGS. 35A and 35B show another embodiment of an optical waveguide for use with an interactive input system, in which each corner has been cylindrically cut at an angle of approximately 90 degrees, leaving each corner semi-circular in shape, as opposed to conically cut-out.

Figure 36:
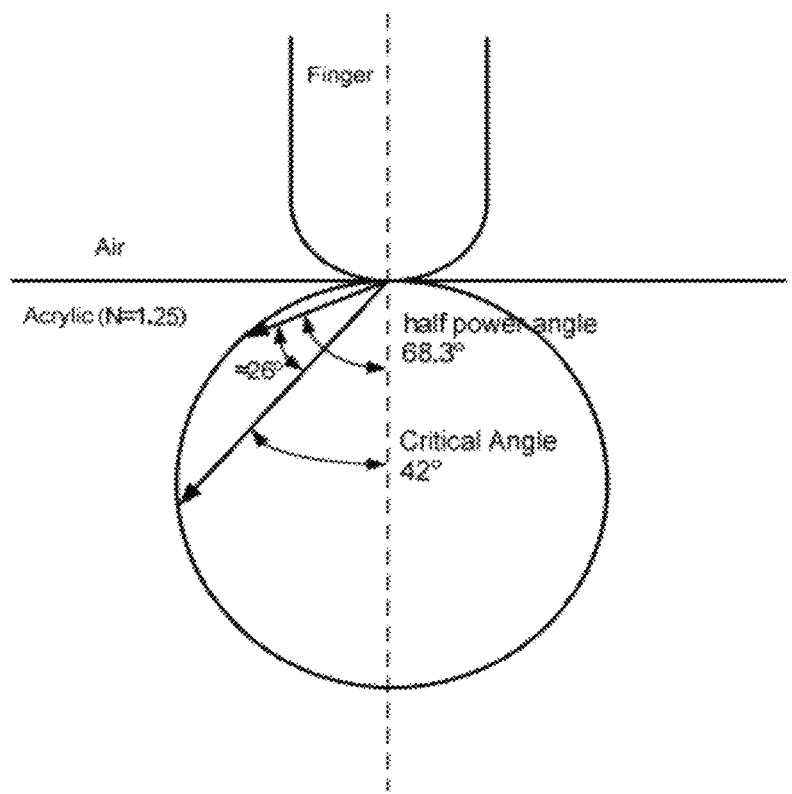
FIG. 36 is a diagram of a Gaussian distribution of optical power reflecting off of a finger and into an optical waveguide.

FIG. 36 is a diagram showing an approximate Gaussian distribution of optical power reflected off of a finger in contact with an optical waveguide. As described above, reflected radiation that bounces off at an angle that is less than the critical angle will tend to eventually be lost, because a fraction of the radiation escapes the waveguide with each reflection.

However, in order to ensure a very good signal to noise ratio however, it is preferable that very little reflected IR radation be lost in this way.

Without being bound to any particular theory, it is likely that more than 70% of the optical power reflected off of a finger and traveling down an acrylic or glass optical waveguide is contained in radiation rays that lie between 42 and 68 degrees from the normal. These angles are based on the knowledge that acrylic and glass have similar indices of refraction, which for the purposes of the following is N=1.5. At N=1.5, the critical angle is about 42 degrees, and the half power angle is about 68 degrees. As such, rays in the 26 degree (68 degrees-42 degrees) power arc will reach a perpendicular image extraction edge E of the optical waveguide between 90 degrees-42 degrees=48 degrees and 90 degrees-68 degrees=22 degrees.

Figure 37:
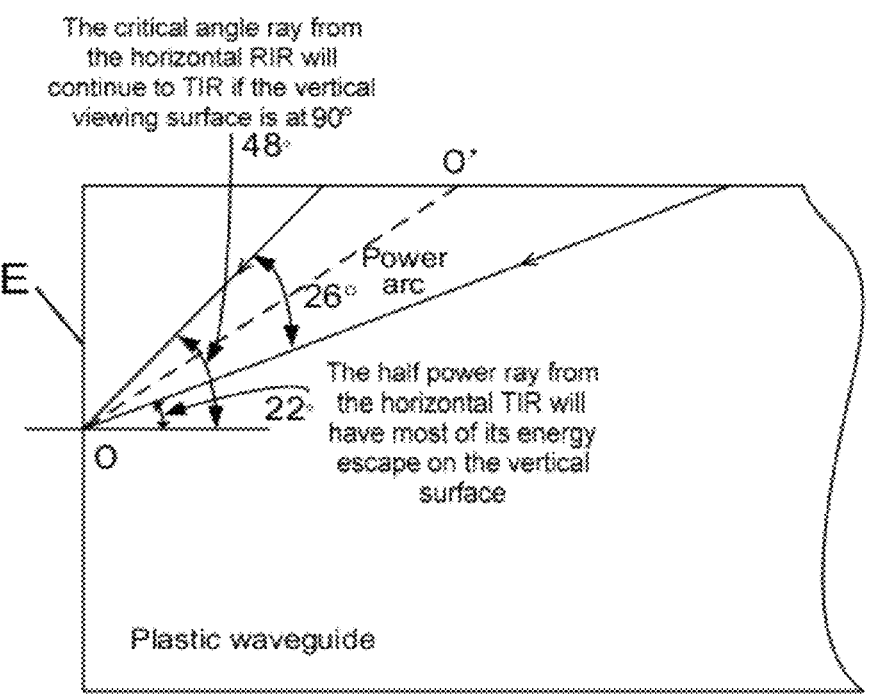
FIG. 37 is a diagram showing a power arc of radiation reaching an edge of the optical waveguide.

FIG. 37 illustrates the power arc of radiation reaching the edge of the optical waveguide at which an imaging device could be positioned. As can be seen, angle OO' represent the angular bisector of the power arc, which extends at an angle of 35 degrees with respect to the surface parallel to the top or bottom surface. Unfortunately, at these angles, much of the radiation reaching the perpendicular image extraction edge E undergoes TIR and therefore gets reflected back into the optical waveguide. This radiation therefore is not available for capture in image frames outside of the optical waveguide and therefore is not available as "signal". From halfway through the arc (i.e. at 35 degrees) to the 48 degree point, the most powerful rays within the optical waveguide are reflected. Thus, the signal attenuation is severe, (in the range of approximately 70% to 90%) and as such only a portion of the radiation rays are refracted on the extraction edge E to escape from the optical waveguide to be captured in image frames.

Figure 38:
FIG. 38 is a diagram showing principle ray bounces from two fingers in contact with an optical waveguide towards a location at the edge of the optical waveguide.
Figure 39:
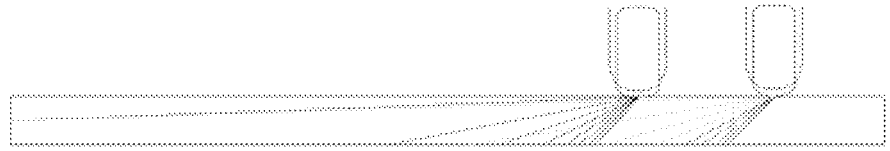
FIG. 39 is a simplified diagram of FIG. 36 showing only the principle rays without bounces.

FIG. 38 is a diagram showing principle ray bounces from two fingers in contact with an optical waveguide towards a location at the extraction edge of the optical waveguide. FIG. 39 is a simplified diagram of FIG. 38 showing just the principle rays without bounces, both inside and outside the 26 degree power arc referred to above. As has been explained above, it is these power arc rays that contain over 70% of the optical power.

It has been discovered that forming the extraction edge in a manner that is not 90 degrees with respect to the top and bottom parallel surfaces of the optical waveguide can reduce the amount of reflection of IR radiation back into the waveguide at the extraction edge, and accordingly increase the amount of IR radiation that escapes from the waveguide at the extraction edge to be captured by an imaging device.

Figure 40:
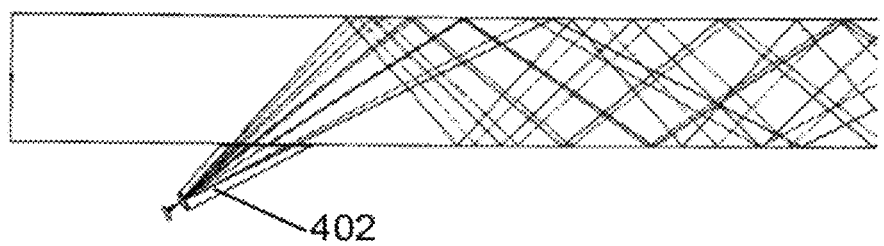
FIGS. 40 and 41 are diagrams showing power arc rays with bounces, and an extraction block.
Figure 41:
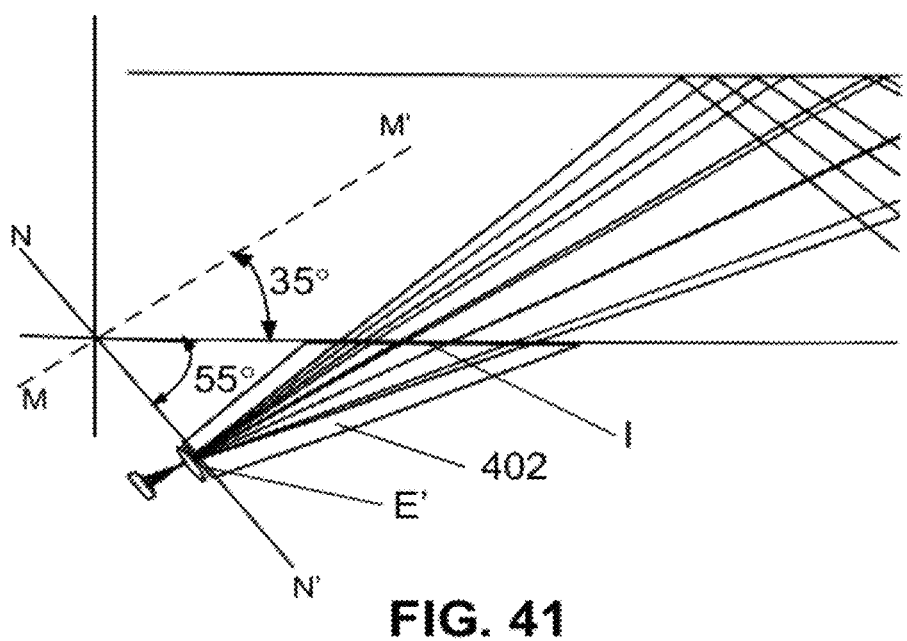

FIG. 40 is a plane view of an optical waveguide showing the power arc rays with bounces, and an additional extraction block 402. FIG. 41 is an enlarged view of the power arc rays and the extraction block of FIG. 40. In this embodiment, the extraction block 402 is constructed of the same material as the optical waveguide, and is positioned directly against the optical waveguide. The extraction block 402 is configured to permit the power arc rays that would otherwise continue to totally internally reflect to escape from the optical waveguide via an input face I of the extraction block 402 and into the extraction block 402. The power arc rays escaping the optical waveguide through an output face E' are passed through a focusing lens 403 for capture in image frames by an imaging device 404.

As can be seen, the input face I of the extraction block is positioned against a small portion of one of the parallel top or bottom surfaces of the optical waveguide. The output face E' of the extraction block 402 is angled with respect to the input face (or plane parallel to the touch surface) so as to ensure that the angles at which the power arc rays passing through the extraction block reach the output face generally do not exceed the critical angle of the extraction block so they can generally exit via the output face E'. In this embodiment, due to the use of the same or similar materials, the refraction index of the extraction block is the same as the refraction index of the waveguide to ensure the power arc does not change after radiation enters the extraction block. As will be appreciated, the extraction block may be molded with the waveguide such that the extraction block and the optical waveguide are a single piece, while maintaining the proper angle of the output face.

In this embodiment, the output face E' extends at a 55 degree angle with respect to the input face I. This angle is chosen such that the output face is oriented perpendicular to line MM' bisecting the 26 degree power arc from 22 to 48 degrees. As the line bisecting this power arc is 35 degrees to the input face, a line NN' perpendicular to the power arc bisecting line is 90-35 degrees=55 degrees. It will be understood that some variation is possible while still advantageously extracting an increased amount of power arc rays than would the 90 degree image extraction edge described in other embodiments.

In this embodiment, the extraction block is formed of the same material as the optical waveguide, such as acrylic or glass. Alternatively, the extraction block may be formed of a different material having the same index of refraction as the optical waveguide. Should the extraction block be formed of a different material having a somewhat different index of refraction as the optical waveguide, then the angle at which power arc rays enter into the extraction block from the input face will be different from the angle at which the power arc rays approached the input face. As such, the output face of the extraction block would in this case be configured to be substantially perpendicular to a line bisecting the angle-shifted power arc within the extraction block, and not at 55 degrees to the input face.

Figure 42:
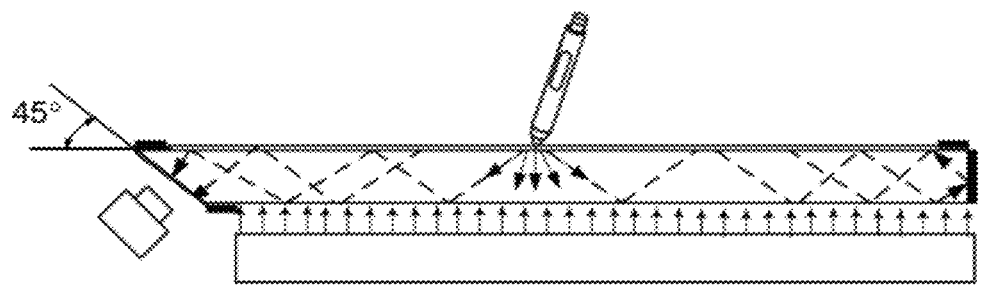
FIG. 42 a side sectional view of another alternative embodiment of an interactive input system.

FIG. 42 shows another configuration of the output surface, which has been cut from the corner of the optical waveguide, similar to that shown in FIGS. 34A and 34B. As can be seen, the output surface has an approximate 45 degree angle with respect to the touch surface. As discussed above, the output surface may be semi-circular or flat. In this way, construction of the waveguide may be simplified since an extraction block need not be accommodated.

In an alternative embodiment, an extraction block is configured such that the output face receives power arc rays indirectly i.e. after a reflection within the extraction block. As such, the output face angle would have to take into consideration the reflection. Such a configuration might be useful where the extraction block is required to be very compact.

As one skilled in the art will appreciate, multiple pointers that are collinear with respect to an imaging device may be disambiguated by modulating the brightness of the display panel beneath multiple candidate pointers and by detecting a change in radiation received at the imaging device during the modulation. More particularly, if spatial information cannot resolve a candidate pointer, then trial solutions may be tested by changing the radiation intensity at a location on the display panel corresponding to the trial location. The radiation intensity modulation could employ one frame from a 60 frame-per-second system, since 17 ms (milliseconds) is well within the switching speed range of AMLCD systems, and would thereby due to its brevity be undetectable by a user.

Figure 43:
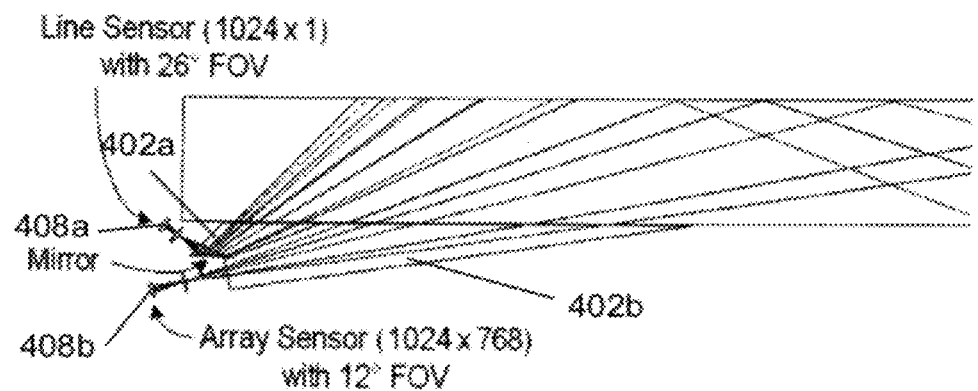
FIG. 43 is a diagram of an interactive input system employing multiple extraction blocks and respective imaging devices for disambiguating pointers that are collinear with respect to the imaging devices.

Alternatively, disambiguation of multiple pointers could be achieved by using a second imaging device having different image capture properties and a different field of view than the first imaging device. Such a configuration is shown in FIG. 43. As can be seen, the 26 degree power arc is captured by a first extraction block 402a and a first imaging device 408a, with an output face that receives rays after having been reflected within the first extraction block 402a. In this embodiment, the first imaging device is a line sensor having a resolution of 1025×1 pixels and a field of view (FOV) of 26 degrees. As will be appreciated, a FOV of 26 degrees leverages the angle range of the power arc. The first imaging device 408a operates at 60 frames per second and provides primary tracking information. A second extraction block 402b is configured to enable rays within the next 12 degrees of arc to escape the optical waveguide. A second imaging device 408b captures radiation escaping from the output surface of the second extraction block 402b. In this embodiment, the second imaging device 408b is an array sensor having a resolution of 1024×768 pixels and having a FOV of 12 degrees. Thus, the second imaging device 408b is configured to focus on the next 12 degrees of arc that contain the higher angle, lower power TIR rays. As will be appreciated, the second imaging device 408b may be configured to integrate longer, for example from about 5 to 30 frames per second in order to capture sufficient radiation in each image for useful processing. However, the 12 degree arc would reveal spatial separation between reflections when two pointers are collinear.

Although an embodiment has been described that uses two imaging devices, one of which is a line sensor and the other of which is an array sensor, variations are available. For example, two line sensors may be positioned in two conically or cylindrically cut corners of an optical waveguide, similar to that shown in FIGS. 34 and 35 to capture the TIR signals. The signals can then be processed to determine the touch locations. The use of line sensors may further reduce the dimension of the interactive system and lower the overall cost.

Although the interactive input system embodiments are described herein as being capable of detecting an active pen, a finger, a passive pointer, etc., those skilled in the art will appreciate that objects having different optical properties may be detected. For example, in the event a material such as silicone or water is brought into contact with the surface of the optical waveguide, the IR radiation introduced into the optical waveguide will refract at a different angle, depending on the material. The different indices of refraction will refract radiation at different angles back into the waveguide, creating reflections at different positions. The higher the index of refraction, the more reflections are visible. Identifying the number of refractions will allow determination of the material type brought into contact with the surface of the optical waveguide.

Although the light emitting diodes are described as emitting infrared radiation, those skilled in the art will appreciate that other wavelengths of radiation may be used, such as for example visible light. Different wavelengths of radiation can be employed to distinguish between different respective pointers emitting the different wavelength radiation, for example.

Although embodiments have been described with reference to the drawings, those of skill in the art will appreciate that variations and modifications may be made without departing from the spirit and scope thereof as defined by the appended claims.

What is claimed is:

1. An interactive input system comprising:
   an optical waveguide;
   a radiation source directing radiation into the optical waveguide, the radiation undergoing total internal reflection within the optical waveguide in response to at least one touch input on a touch surface of the optical waveguide;
   at least one imaging device positioned adjacent to the optical waveguide and having a field of view looking inside the optical waveguide and capturing image frames thereof;
   non-reflective radiation absorbing material positioned about a periphery of the optical waveguide so as not to occlude the field of view of the at least one imaging device, the non-reflective radiation absorbing material configured to absorb the radiation propagating within the optical waveguide that reaches the periphery of the optical waveguide at which the non-reflective radiation absorbing material is positioned; and
   processing structure for processing the image frames to determine a location of the at least one touch input based on a frequency of reflections of the radiation in the image frame.

2. The interactive input system of claim 1, wherein the radiation source is positioned on a side of the optical waveguide that is opposite to the touch surface.

3. The interactive input system of claim 1, wherein the processing structure determines the location based also on an angular position of the reflections with respect to the imaging device.

4. The interactive input system of claim 1, wherein the radiation source is connected to a pointer.

5. The interactive input system of claim 4, wherein the pointer is triggered to direct radiation into the optical waveguide in response to touch contact on the surface of the waveguide by a tip of the pointer.

6. The interactive input system of claim 1, wherein the optical waveguide is generally rectangular in shape.

7. The interactive input system of claim 6, wherein at least one of the top and bottom surfaces of the optical waveguide is processed to enhance scattering of radiation.

8. An interactive input system comprising:
   an optical waveguide within which radiation can be totally internally reflected, the optical waveguide having two parallel surfaces and an image extraction surface extending between the parallel surfaces to permit the radiation reaching the image extraction surface to escape;
   at least one imaging device having a field of view aimed at the image extraction surface to capture image frames thereof;
   non-reflective radiation absorbing material positioned about a periphery of the optical waveguide so as not to occlude the field of view of the at least one imaging device, the non-reflective radiation absorbing material configured to absorb the radiation propagating within the optical waveguide that reaches the periphery of the optical waveguide at which the non-reflective radiation absorbing material is positioned; and
   processing structure for processing the image frames captured by the at least one imaging device to determine a location of at least one touch input on one or more of the parallel surfaces based on a frequency of reflections of the radiation in the image frames.

9. The interactive input system of claim 8, wherein the image extraction surface has an extraction angle with respect to the surface of the waveguide that is greater than a critical angle of the waveguide.

10. The interactive input system of claim 9, wherein the extraction angle is one of: 45 degrees, 55 degrees, 90 degrees.

11. The interactive input system of claim 8, wherein the processing structure determines the location based also on an angular position of the reflections with respect to the imaging device.

12. The interactive input system of claim 8, further comprising:
  a radiation source directing background radiation through the optical waveguide via at least one of the parallel surfaces,
  wherein in the event that at least one pointer contacts or is proximate to one of the parallel surfaces, at least a portion of the background radiation being directed through the optical waveguide is reflected off of the respective pointer back into and along the optical waveguide.

13. The interactive input system of claim 12 further comprising a display panel, wherein the radiation source is positioned between the optical waveguide and the display panel.

14. A method for determining the location of a pointer in touch contact with an optical waveguide causing radiation within the waveguide to undergo total internal reflection, the method comprising:
  capturing images of the inside of the optical waveguide using at least one imaging device;
  absorbing the radiation propagating within the optical waveguide that reaches a periphery of the optical waveguide using a non-reflective radiation absorbing material positioned about the periphery so as not to occlude the field of view of the at least one imaging device; and
  processing the images to determine the location of the pointer based on a frequency of reflections of the radiation and an angular position of the reflections with respect to the position of the imaging device.

15. The method of claim 14 wherein the processing comprises:
  calculating a vertical intensity profile for the captured images;
  finding a maximum vertical intensity profile; and
  determining the frequency of reflections of the radiation along an image column corresponding to a maximum value of the vertical intensity profile.

16. The method of claim 15 wherein the determining comprises:
  converting the captured images into a frequency domain; and
  applying a frequency domain analysis method to the captured images.

17. The method of claim 15 further comprising:
  identifying a pointer distance to the at least one imaging device corresponding to the frequency of reflections of the radiation.

18. The method of claim 17 wherein the angular position of the reflections with respect to the position of the imaging device corresponds to a pointer angle.

19. The method of claim 18 wherein the processing further comprises:
  identifying the pointer angle corresponding to the maximum value of the vertical intensity profile.

20. An interactive input system comprising:
  an optical waveguide within which radiation can be totally internally reflected, the optical waveguide having two parallel surfaces;
  an extraction block having an input face against a portion of one of the parallel surfaces, wherein the extraction block permits radiation in the optical waveguide that reaches the portion to escape into the extraction block via the input face and to exit the extraction block via an output face;
  an imaging device having a field of view looking at the output face and capturing image frames thereof; and
  non-reflective radiation absorbing material positioned about a periphery of the optical waveguide so as not to occlude the field of view of the imaging device, the non-reflective radiation absorbing material configured to absorb the radiation propagating within the optical waveguide that reaches the periphery of the optical waveguide at which the non-reflective radiation absorbing material is positioned.

21. The interactive input system of claim 20, wherein the output face of the extraction block is at an angle, with respect to the input face of the extraction block, greater than a critical angle of the optical waveguide.

22. The interactive input system of claim 21, wherein the angle is 55 degrees to the surface of the waveguide.

23. The interactive input system of claim 20, further comprising:
  a radiation source directing background radiation through the optical waveguide via at least one of the parallel surfaces,
  wherein in the event at least one pointer contacts one of the parallel surfaces, at least a portion of the background radiation being directed through the optical waveguide is reflected off of the respective pointer back into and along the optical waveguide.

24. The interactive input system of claim 23 further comprising a display panel, wherein the radiation source is positioned to emit background radiation towards the display panel to reflect off of the display panel and into the optical waveguide.

25. The interactive input system of claim 24, further comprising a redirection structure for receiving the background radiation emitted by the radiation source and directing the background radiation towards the display panel.

26. The interactive input system of claim 25, wherein the redirection structure is one of a prism and a mirror.

27. The interactive input system of claim 20, further comprising a lens positioned between the output face and the imaging device for focusing the radiation exiting from the output face.

28. The interactive input system of claim 27, wherein the extraction block and the optical waveguide are formed from the same material.

29. The interactive input system of claim 28, wherein the extraction block and the optical waveguide are a single unit.

30. The interactive input system of claim 20, wherein in the event that radiation emitted by at least one pointer is injected into and along the optical waveguide via one of the parallel surfaces, the image frames captured by the imaging device include the emitted radiation.

31. The interactive input system of claim 30, further comprising:
  a processing structure for processing image frames to determine a location of the at least one pointer on the one parallel surface at which the radiation entered into the optical waveguide.

32. The interactive input system of claim 31, wherein the location for the at least one pointer is determined based on positions at which reflections of the respective radiation appear in an image frame being processed.

33. The interactive input system of claim 32, wherein the location for each of the at least one pointers is determined based on a frequency of the reflections of the respective radiation appearing in an image frame being processed.

34. The interactive input system of claim 33, wherein the location for each of the at least one pointers is also determined based on an angular position of the reflections with respect to the position of the imaging device.

* * * * *